US010887337B1

(12) United States Patent
Kim et al.

(10) Patent No.: US 10,887,337 B1
(45) Date of Patent: *Jan. 5, 2021

(54) DETECTING AND TRAIL-CONTINUATION FOR ATTACKS THROUGH REMOTE DESKTOP PROTOCOL LATERAL MOVEMENT

(71) Applicant: Confluera, Inc., Palo Alto, CA (US)

(72) Inventors: Eun-Gyu Kim, San Carlos, CA (US);
Rushikesh Patil, Santa Clara, CA (US);
Sandeep Siroya, Santa Clara, CA (US);
Niloy Mukherjee, San Jose, CA (US)

(73) Assignee: Confluera, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/903,785

(22) Filed: Jun. 17, 2020

(51) Int. Cl.
*H04L 29/06* (2006.01)
*H04L 29/08* (2006.01)

(52) U.S. Cl.
CPC ...... *H04L 63/1433* (2013.01); *H04L 63/1441* (2013.01); *H04L 67/08* (2013.01)

(58) Field of Classification Search
CPC .. H04L 63/1433; H04L 63/1441; H04L 67/08
See application file for complete search history.

(56) References Cited

U.S. PATENT DOCUMENTS

| 5,001,628 | A | 3/1991 | Johnson et al. |
| 7,890,869 | B1 | 2/2011 | Mayer et al. |
| 9,967,265 | B1 | 5/2018 | Peer et al. |
| 10,102,374 | B1 | 10/2018 | Cohen et al. |
| 10,121,000 | B1 | 11/2018 | Rivlin et al. |
| 10,257,219 | B1 | 4/2019 | Geil et al. |
| 10,389,738 | B2 | 8/2019 | Muddu et al. |
| 10,417,424 | B2 | 9/2019 | Cohen et al. |
| 10,419,450 | B2 | 9/2019 | Muddu et al. |
| 10,425,429 | B2 | 9/2019 | Bassett |
| 2004/0177244 | A1* | 9/2004 | Murphy ............... G06F 9/5077 713/100 |

(Continued)

OTHER PUBLICATIONS

King et al. (Backtracking Intrusions, ACM Transactions on Computer Systems, vol. 23, No. 1, Feb. 2005, pp. 51-76.) (Year: 2005).*

(Continued)

*Primary Examiner* — Oleg Korsak
(74) *Attorney, Agent, or Firm* — Goodwin Procter LLP

(57) ABSTRACT

Infrastructure attacks involving lateral movement are identified by monitoring system level activities using software agents deployed on respective operating systems, and constructing, based on the system level activities, an execution graph comprising execution trails. A logon session between a remote connection client executing on a first operating system and a remote connection server executing on a second operating system is identified. Behavior exhibited from the logon session is attributed to a first global execution trail in the execution graph. A reconnection to the logon session between a remote connection client executing on a third operating system and the remote connection server is then identified, and, thereafter, behavior exhibited from the logon session is attributed to a second global execution trail in the execution graph.

20 Claims, 17 Drawing Sheets

(56) References Cited

U.S. PATENT DOCUMENTS

| | | | |
|---|---|---|---|
| 2007/0209075 A1* | 9/2007 | Coffman | H04L 63/14 726/23 |
| 2009/0204696 A1* | 8/2009 | Zhang | H04L 67/325 709/223 |
| 2009/0248465 A1 | 10/2009 | Recce et al. | |
| 2010/0257253 A1 | 10/2010 | Saha et al. | |
| 2011/0265182 A1 | 10/2011 | Peinado et al. | |
| 2012/0255003 A1 | 10/2012 | Sallam | |
| 2014/0245376 A1 | 8/2014 | Hibbert et al. | |
| 2014/0359776 A1 | 12/2014 | Liu | |
| 2015/0074806 A1 | 3/2015 | Roundy et al. | |
| 2016/0042179 A1 | 2/2016 | Weingarten et al. | |
| 2016/0078365 A1 | 3/2016 | Baumard | |
| 2016/0099953 A1 | 4/2016 | Hebert et al. | |
| 2016/0191532 A1 | 6/2016 | Seiver et al. | |
| 2016/0205122 A1 | 7/2016 | Bassett | |
| 2016/0217282 A1 | 7/2016 | Vecera et al. | |
| 2016/0275288 A1 | 9/2016 | Sethumadhavan et al. | |
| 2016/0337387 A1 | 11/2016 | Hu et al. | |
| 2016/0371489 A1 | 12/2016 | Puri et al. | |
| 2016/0373481 A1 | 12/2016 | Sultan et al. | |
| 2017/0006055 A1* | 1/2017 | Strom | G06F 30/20 |
| 2017/0041338 A1 | 2/2017 | Martini et al. | |
| 2017/0078322 A1 | 3/2017 | Seiver et al. | |
| 2017/0118240 A1 | 4/2017 | Devi Reddy et al. | |
| 2017/0244729 A1 | 8/2017 | Fahrny et al. | |
| 2017/0289187 A1 | 10/2017 | Noel et al. | |
| 2017/0300690 A1 | 10/2017 | Ladnai et al. | |
| 2017/0300701 A1 | 10/2017 | Ponta et al. | |
| 2018/0060144 A1 | 3/2018 | Capobianco et al. | |
| 2018/0144138 A1 | 5/2018 | Zhang | |
| 2018/0219888 A1 | 8/2018 | Apostolopoulos | |
| 2018/0316715 A1 | 11/2018 | Liu et al. | |
| 2018/0351991 A1 | 12/2018 | Jones et al. | |
| 2019/0081971 A1* | 3/2019 | Jones | G06F 21/552 |
| 2019/0158520 A1 | 5/2019 | DiValentin et al. | |
| 2019/0258800 A1 | 8/2019 | Ladnai et al. | |
| 2019/0373005 A1 | 12/2019 | Bassett | |

OTHER PUBLICATIONS

Sitaraman et al. (Forensic Analysis of File System Intrusions using Improved Backtracking, 2005 IEEE, 10 pages) (Year: 2005).*
U.S. Appl. No. 16/521,821, filed Jul. 25, 2019, Abhijit Ghosh et al.
U.S. Appl. No. 16/523,494, filed Jul. 26, 2019, Abhijit Ghosh et al.
U.S. Appl. No. 16/521,855, filed Jul. 25, 2019, Abhijit Ghosh et al.
U.S. Appl. No. 16/522,056, filed Jul. 25, 2019, Abhijit Ghosh et al.
U.S. Appl. No. 16/522,104, filed Jul. 25, 2019, Abhijit Ghosh et al.
U.S. Appl. No. 16/522,342, filed Jul. 25, 2019, Abhijit Ghosh et al.
https://scholar.google.com/scholar "Monitoring Agent Operating Systems" Sep. 24, 2019.

* cited by examiner

DETECTING AND TRAIL-CONTINUATION FOR ATTACKS THROUGH REMOTE DESKTOP PROTOCOL LATERAL MOVEMENT

FIELD OF THE INVENTION

The present disclosure relates generally to network security, and, more specifically, to systems and methods for identifying and modeling attack progressions in real-time through enterprise infrastructure or other systems and networks.

BACKGROUND

The primary task of enterprise security is to protect critical assets. These assets include mission critical business applications, customer data, intellectual property and databases residing on-premises or in the cloud. The security industry focuses on protecting these assets by preventing entry through endpoint devices and networks. However, end points are indefensible as they are exposed to many attack vectors such as social engineering, insider threats and malware. With ever increasing mobile workforce and dynamic workloads, the network perimeter also no longer exists. With ever increasing breaches, flaws in enterprise security are exposed on a more frequent basis.

The typical attack timeline on critical infrastructure consists of initial entry, undetected persistence and ultimate damage, with persistence being in a matter of minutes, hours, weeks, or months using sophisticated techniques. However, security solutions focus on two ends of the spectrum: either on entry prevention in hosts and networks, or on ex post facto forensics to identify the root cause. Such retroactive analysis often involves attempts to connect the dots across a plethora of individual weak signals coming from multiple silo sources with potential false positives. As a result, the critical phase during which attacks progress in the system and stealthily change their appearance and scope often remains undetected.

Traditional security solutions are unable to deterministically perform attack progression detection for multiple reasons. These solutions are unimodal, and rely either on artifact signatures (e.g., traditional anti-virus solutions) or simple rules to detect isolated behavioral indicators of compromise. The individual sensors used in these approaches are, by themselves, weak and prone to false positives. An individual alert is too weak a signal to deterministically infer that an attack sequence is in progress. Another reason is that, while an attacker leaves traces of malicious activity, the attack campaign is often spread over a large environment and an extended period of time. Further, the attacker often has the opportunity to remove evidence before a defender can make use of it. Today, security operations teams have to make sense out of a deluge of alerts from many individual sensors not related to each other. Typical incidence response to an alert is onion peeling, a process of drilling down and pivoting from one log to another. This form of connecting the dots looking for an execution trail from a large volume of information is beyond human capacity. Enhanced techniques for intercepting and responding to infrastructure-wide attacks are needed.

In addition, among several lateral movement techniques that can be employed during an attack progression, Remote Desktop Protocol (RDP) is a frequently utilized one. For example, an attacker may use stolen user credentials to gain access to target machines over RDP. Most known lateral movement techniques have a one-to-one relationship between the client request and the server logon session. However, Windows RDP is unique among such techniques. An existing RDP logon session for a particular user consists of the user interface, foreground, as well as background-running applications. Notably, a new connection can override the existing session and continue with a new session. The new session user can continue performing any arbitrary actions (interact with UI, launch an app, issue commands from the terminal window, etc.) through the user interface. While there currently exist approaches to detect RDP connections and reconnections from different RDP clients, these approaches do not detect an ongoing attack progression from one RDP session to the next, and, subsequently, fail to capture the path taken by an attacker migrating among clients over an extended period of time.

BRIEF SUMMARY

In one aspect, a computer-implemented method for identifying infrastructure attacks includes the steps of: monitoring system level activities by a plurality of software agents deployed on respective operating systems; constructing, based on the system level activities, an execution graph comprising a plurality of execution trails; identifying a logon session between a remote connection client executing on a first one of the operating systems and a remote connection server executing on a second one of the operating systems; attributing, to a first global execution trail in the execution graph, behavior exhibited from the logon session; identifying a reconnection to the logon session between a remote connection client executing on a third one of the operating systems and the remote connection server; and following the reconnection, attributing, to a second global execution trail in the execution graph, behavior exhibited from the logon session. Other aspects of the foregoing including corresponding systems having memories storing instructions executable by a processor, and computer-executable instructions stored on non-transitory computer-readable storage media.

In one implementation, identifying the logon session comprises: identifying an process connection event issued by the remote connection client on the first operating system to connect with the remote connection server on the second operating system; creating, in a first local execution trail associated with the first operating system, a node corresponding to the process connection event issued by the remote connection client on the first operating system; identifying, on the second operating system, a logon event for the logon session corresponding to the process connection event issued by the remote connection client on the first operating system; creating, in a second local execution trail associated with the second operating system, a node corresponding to the logon event; and forming an edge between the first local execution trail and the second local execution trail. The first local execution trail and the second local execution trail can be assigned to the first global execution trail based on the logon session. Attributing behavior exhibited from the logon session to the first global execution trail can include: identifying, on the second operating system, a creation of a process in the logon session; and associating the process with the second local execution trail.

In another implementation, identifying the reconnection to the logon session comprises: identifying an process connection event issued by a remote connection client on a third one of the operating systems to connect with the remote connection server on the second operating system; creating, in a third local execution trail associated with the third operating system, a node corresponding to the process connection event issued by the remote connection client on the third operating system; identifying, on the second operating system, a reconnect event for the logon session corresponding to the process connection event issued by the remote connection client on the third operating system; creating, in a fourth local execution trail associated with the second operating system, a node corresponding to the reconnect event; and forming an edge between the third local execution trail and the fourth local execution trail. The third local execution trail and the fourth local execution trail can be assigned to the second global execution trail based on the reconnection to the logon session. Attributing behavior exhibited from the logon session to the second global execution trail can include: identifying, on the second operating system, a creation of a process in the logon session; and associating the process with the fourth local execution trail.

In various other implementations, one or more of the following features are present. The system level activities include Remote Desktop Protocol (RDP) events, the remote connection client comprises an RDP client, and the remote connection server comprises an RDP server. The execution graph constructed by a particular one of the software agents comprises a plurality of nodes and a plurality of edges connecting the nodes, wherein each node represents an entity comprising a process or an artifact, and wherein each edge represents an event associated with an entity. A risk score is determined for each of the global execution trails, wherein the risk score for a particular one of the global execution trails is determined based on risk scores of local execution trails from which the particular global execution trail is formed.

The details of one or more implementations of the subject matter described in the present specification are set forth in the accompanying drawings and the description below. Other features, aspects, and advantages of the subject matter will become apparent from the description, the drawings, and the claims.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the implementations. In the following description, various implementations are described with reference to the following drawings.

DETAILED DESCRIPTION

Figure 1:
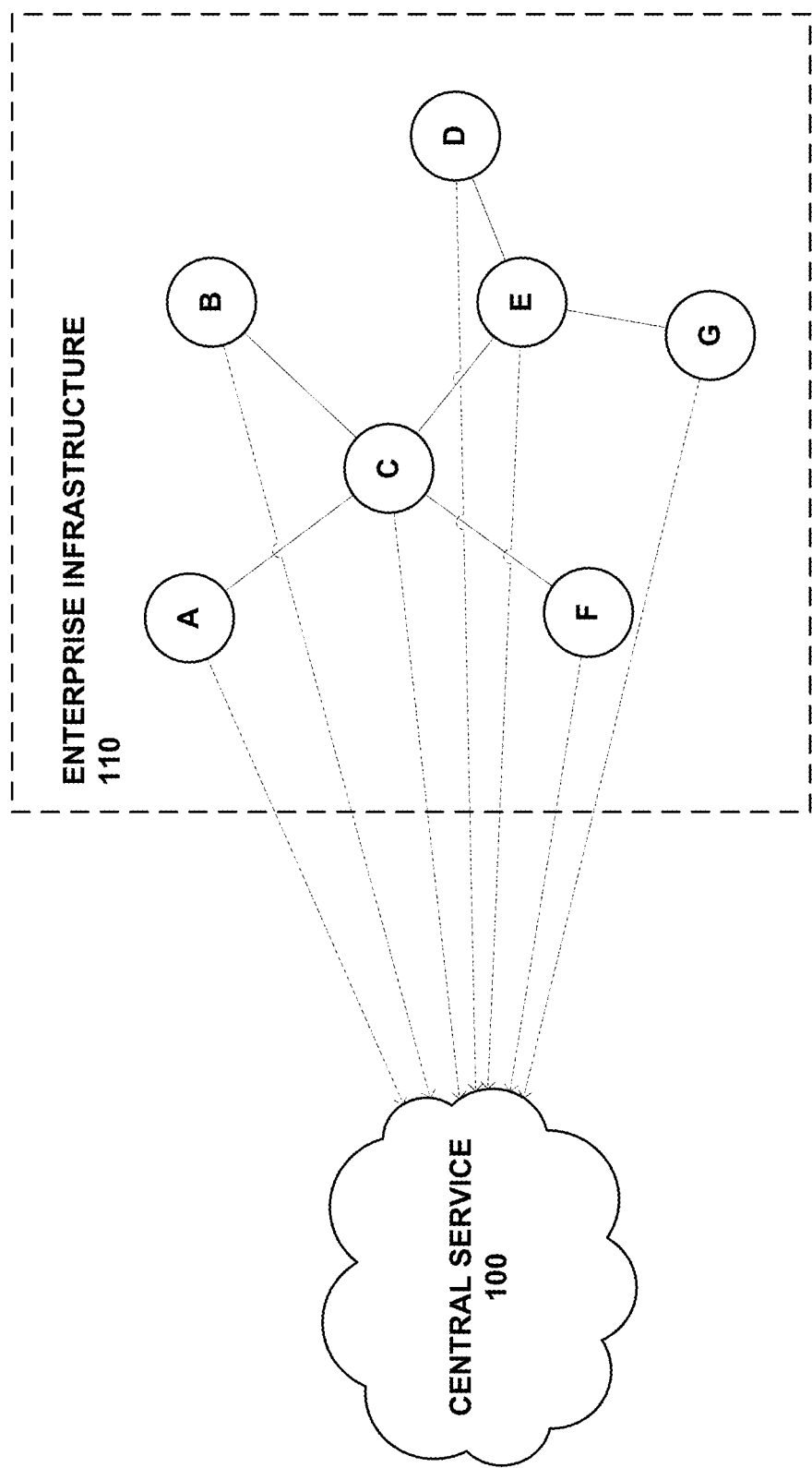
FIG. 1 depicts an example high-level system architecture for an attack progression tracking system including agents and a central service.

Described herein is a unique enterprise security solution that provides for precise interception and surgical response to attack progression, in real time, as it occurs across a distributed infrastructure, whether aggressively in seconds or minutes, or slowly and steadily over hours, days, weeks, months, or longer. The solution achieves this through a novel data monitoring and management framework that continually models system level host and network activities as mutually exclusive infrastructure wide execution sequences, and bucketizes them into unique execution trails. A multi-modal intelligent security middleware detects indicators of compromise (IoC) in real-time on top of subsets of each unique execution trail using rule based behavioral analytics, machine learning based anomaly detection, and other sources described further herein. Each such detection result dynamically contributes to aggregated risk scores at execution trail level granularities. These scores can be used to prioritize and identify highest risk attack trails to end users, along with steps that such end users can perform to mitigate further damage and progression of an attack.

In one implementation, the proposed solution incorporates the following primary features, which are described in further detail below: (1) distributed, high-volume, multi-dimensional (e.g., process, operating system, network) execution trail tracking in real time within hosts, as well as across hosts, within an infrastructure (e.g., an enterprise network); (2) determination of indicators of compromise and assignment of risk on system level entities, individual system level events, or clusters of system level events within execution trails, using behavioral anomaly based detection functions based on rule-based behavioral analytics and learned behavior from observations of user environments; (3) evaluation and iterative re-evaluation of risk of execution trails as they demonstrate multiple indicators of compromise over a timeline; and (4) concise real-time visualization of execution trails, including characterizations of the trails in terms of risk, and descriptions relating to posture, reasons for risk, and recommendations for actions to mitigate identified risks.

The techniques described herein provide numerous benefits to enterprise security. In one instance, such techniques facilitate clear visualization of the complete "storyline" of an attack progression in real-time, including its origination, movement through enterprise infrastructure, and current state. Security operations teams are then able to gauge the complete security posture of the enterprise environment. As another example benefit, the present solution eliminates the painstaking experience of top-down wading through deluges of security alerts, replacing that experience instead with real-time visualization of attack progressions, built from the bottom up. Further, the solution provides machine-based comprehension of attack progressions at fine granularity, which enables automated, surgical responses to attacks. Such responses are not only preventive to stop attack progression, but are also adaptive, such that they are able to dynamically increase scrutiny as the attack progression crosses threat thresholds. Accordingly, armed with a clear visualization of a security posture spanning an entire enterprise environment, security analysts can observe all weaknesses that an attack has taken advantage of, and use this information to bolster defenses in a meaningful way.

As used herein, these terms have the following meanings, except where context dictates otherwise.

"Agent" or sensor" refers to a privileged process executing on a host (or virtual machine) that instruments system level activities (set of events) generated by an operating system or other software on the host (or virtual machine).

"Hub" or "central service" refers to a centralized processing system, service, or cluster which is a consolidation point for events and other information generated and collected by the agents.

"Execution graph" refers to a directed graph, generated by an agent and/or the hub, comprising nodes (vertices) that represent entities, and edges connecting nodes in the graph, where the edges represent events or actions that are associated with one or more of the nodes to which the edges are connected. Edges can represent relationships between two entities, e.g., two processes, a process and a file, a process and a network socket, a process and a registry, and so on. An execution graph can be a "local" execution graph (i.e., associated with the events or actions on a particular system monitored by an agent) or a "global" or "distributed" execution graph (i.e., associated with the events or actions on multiple systems monitored by multiple agents).

"Entity" refers to a process or an artifact (e.g., file, directory, registry, socket, pipe, character device, block device, or other type).

"Event" or "action" refers to a system level or application level event or action that can be associated with an entity, and can include events such as create directory, open file, modify data in a file, delete file, copy data in a file, execute process, connect on a socket, accept connection on a socket, fork process, create thread, execute thread, start/stop thread, send/receive data through socket or device, and so on.

"System events" or "system level activities" and variations thereof refer to events that are generated by an operating system at a host, including, but not limited to, system calls.

"Execution trail" or "progression" refers to a partition or subgraph of an execution graph, typically isolated by a single intent or a single unit of work. For example, an execution trail can be a partitioned graph representing a single SSH session, or a set of activities that is performed for a single database connection. An execution trail can be, for example, a "local" execution trail that is a partition or subgraph of a local execution graph, or a "global" or "distributed" execution trail that is a partition or subgraph of a global execution graph.

"Attacker" refers to an actor (e.g., a hacker, team of individuals, software program, etc.) with the intent or appearance of intent to perform unauthorized or malicious activities. Such attackers may infiltrate an enterprise infrastructure, secretly navigate a network, and access or harm critical assets.

System Architecture

In one implementation, a deterministic system facilitates observing and addressing security problems with powerful, real-time, structured data. The system generates execution graphs by deploying agents across an enterprise infrastructure. Each agent instruments the local system events generated from the host and converts them to graph vertices and edges that are then consumed by a central processing cluster, or hub. Using the relationships and attributes of the execution graph, the central processing cluster can effectively extract meaningful security contexts from events occurring across the infrastructure.

FIG. 1 depicts one implementation of the foregoing system, which includes two primary components: a central service 100 and a distributed fabric of agents (sensors) A-G deployed on guest operating systems across an enterprise infrastructure 110. For purposes of illustration, the enterprise infrastructure 110 includes seven agents A-G connected in a network (depicted by solid lines). However, one will appreciate that an enterprise infrastructure can include tens, hundreds, or thousands of computing systems (desktops, laptops, mobile devices, etc.) connected by local area networks, wide area networks, and other communication methods. The agents A-G also communicate using such methods with central service 100 (depicted by dotted lines). Central service 100 can be situated inside or outside of the enterprise infrastructure 110.

Figure 2:
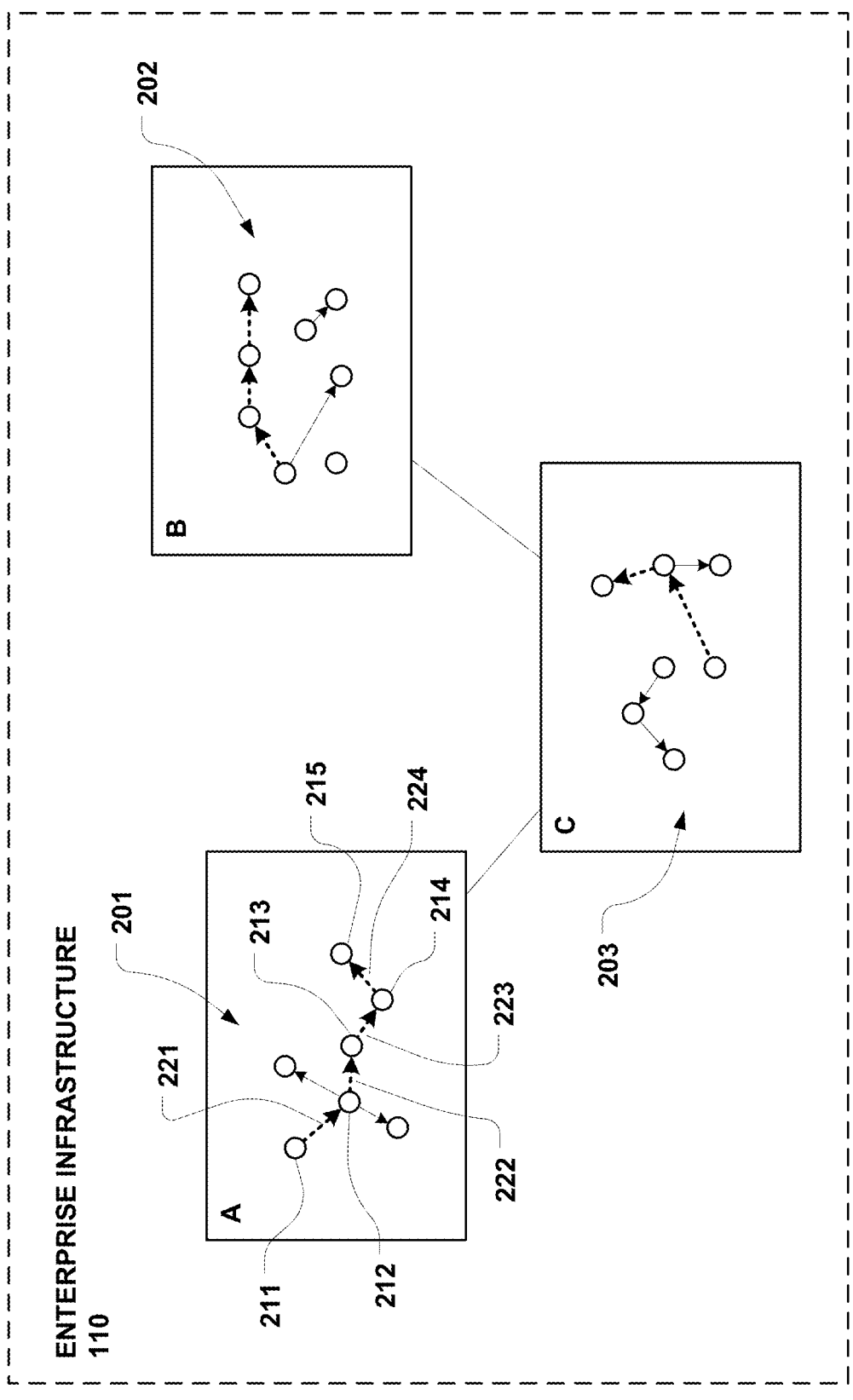
FIG. 2 depicts an example of local execution graphs created by agents executing on hosts in an enterprise infrastructure.

Each agent A-G monitors system level activities in terms of entities and events (e.g., operating system processes, files, network connections, system calls, and so on) and creates, based on the system level activities, an execution graph local to the operating system on which the agent executes. For purposes of illustration, FIG. 2 depicts simplified local execution graphs 201, 202, 203 respectively created by agents A-C within enterprise infrastructure 110. Local execution graph 201, for example, includes a local execution trail (represented by a bold dashed line), which includes nodes 211, 212, 213, 214, and 215, connected by edges 221, 222, 223, and 224. Other local execution trails are similarly represented by bold dashed lines within local execution graphs 202 and 203 created by agents B and C, respectively.

Figure 3:
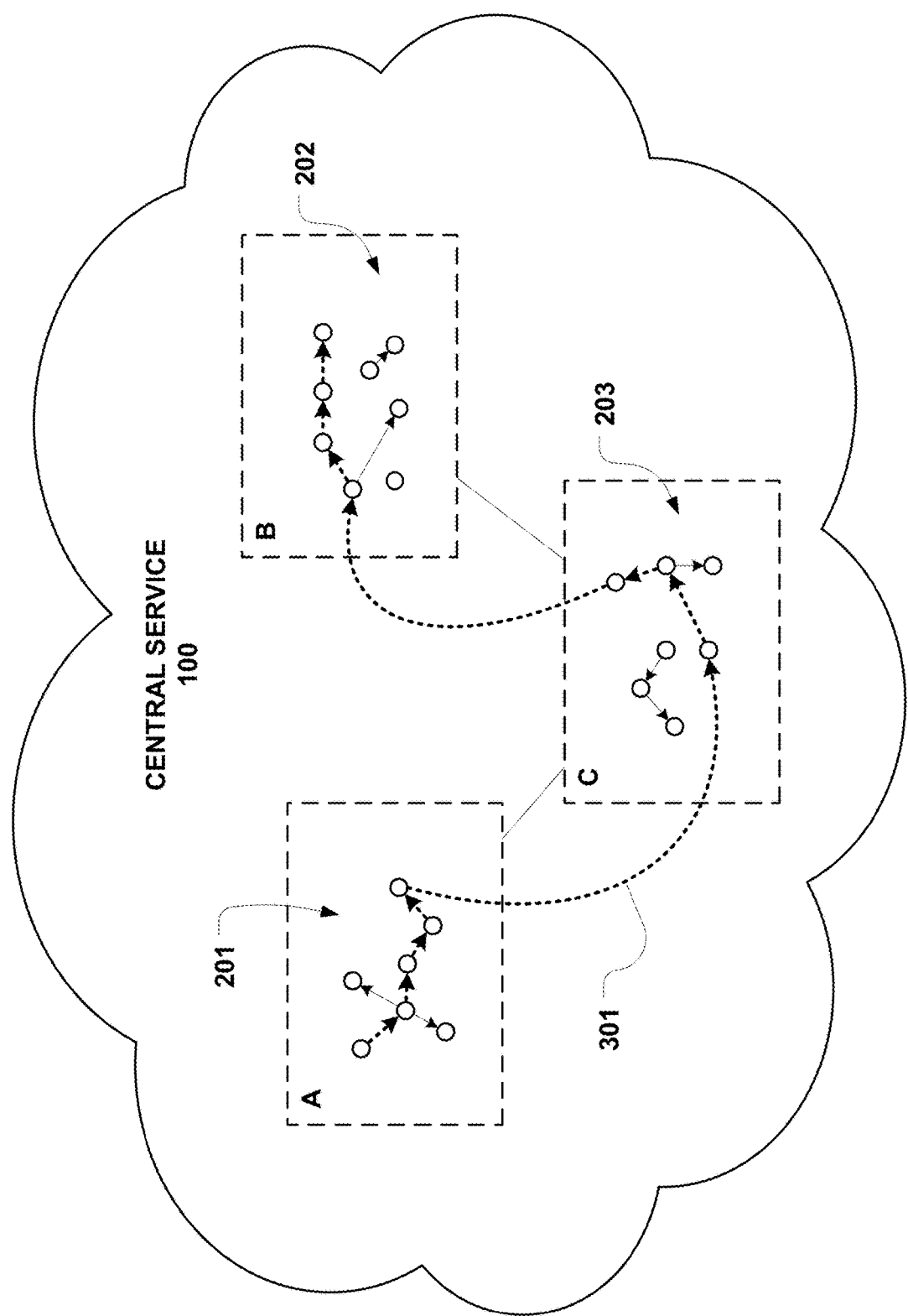
FIG. 3 depicts the local execution graphs of FIG. 2 connected at a central service to form a global execution graph.

The local execution graphs created by the agents A-G are sent to the central service 100 (e.g., using a publisher-subscriber framework, where a particular agent publishes its local execution graph or updates thereto to the subscribing central service 100). In some instances, the local execution graphs are compacted and/or filtered prior to being sent to the central service 100. The central service consumes local execution graphs from a multitude of agents (such as agents A-G), performs in-memory processing of such graphs to determine indicators of compromise, and persists them in an online data store. Such data store can be, for example, a distributed flexible schema online data store. As and when chains of execution perform lateral movement between multiple operating systems, the central service 100 performs stateful unification of graphs originating from individual agents to achieve infrastructure wide execution trail continuation. The central service 100 can also include an application programming interface (API) server that communicates risk information associated with execution trails (e.g., risk scores for execution trails at various granularities). FIG. 3 depicts local execution graphs 201, 202, and 203 from FIG. 2, following their receipt at the central service 100 and merger into a global execution graph. In this example, the local execution trails depicted in bold dashed lines in local execution graphs 201, 202, 203 are determined to be related and, thus, as part of the merger of the graphs 201, 202, 203, the local execution trails are connected into a continuous global execution trail 301 spanning across multiple operating systems in the infrastructure.

Figure 4:
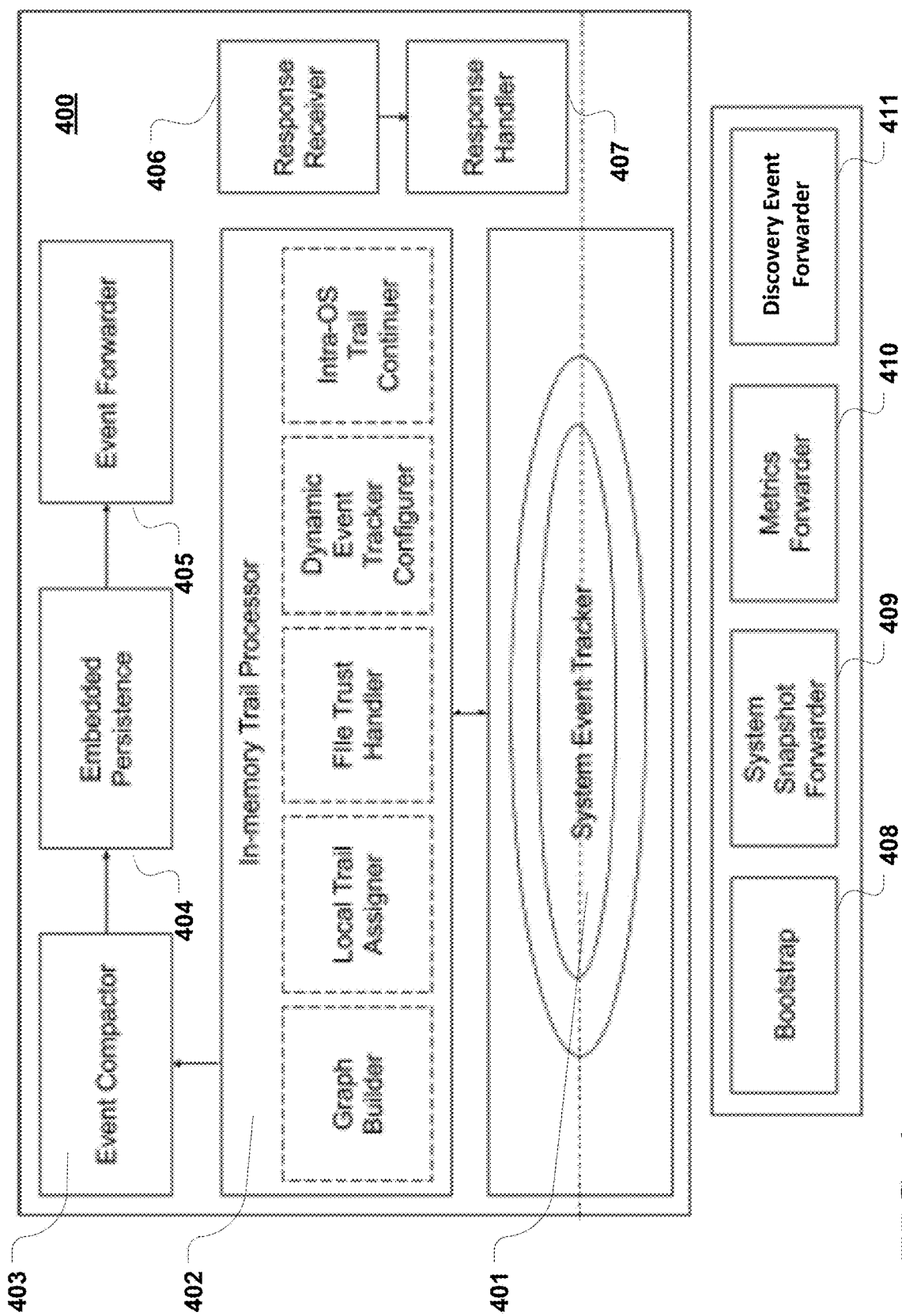
FIG. 4 depicts one implementation of an agent architecture in an attack progression tracking system

FIG. 4 depicts an example architecture of an agent 400, according to one implementation, in which a modular approach is taken to allow for the enabling and disabling of granular features on different environments. The modules of the agent 400 will now be described.

System Event Tracker 401 is responsible for monitoring systems entities, such as processes, local files, network files, and network sockets, and events, such as process creation, execution, artifact manipulation, and so on, from the host operating system. In the case of the Linux operating system, for example, events are tracked via an engineered, high-performance, lightweight, scaled-up kernel module that produces relevant system call activities in kernel ring buffers that are shared with user space consumers. The kernel module has the capability to filter and aggregate system calls based on static configurations, as well as dynamic configurations, communicated from other agent user space components.

In-memory Trail Processor 402 performs numerous functions in user space while maintaining memory footprint constraints on the host, including consuming events from System Event Tracker 401, assigning unique local trail identifiers to the consumed events, and building entity relationships from the consumed events. The relationships are built into a graph, where local trail nodes can represent processes and artifacts (e.g., files, directories, network sockets, character devices, etc.) and local trail edges can represent events (e.g., process triggered by process (fork, execve, exit); artifact generated by process (e.g., connect, open/ O_CREATE); process uses artifact (e.g., accept, open, load)). The In-memory Trail Processor 402 can further perform file trust computation, dynamic reconfiguration of the System Event Tracker 401, and connecting execution graphs to identify intra-host trail continuation. Such trail continuation can include direct continuation due to intra-host process communication, as well as indirect setting membership of intra-host trails based on file/directory manipulation (e.g., a process in trail A uses a file generated by trail B).

Event Compactor 403 is an in-memory graph compactor that assists in reducing the volume of graph events that are forwarded to the central service 100. The Event Compactor 403, along with the System Event Tracker 401, is responsible for event flow control from the agent 400. Embedded Persistence 404 assists with faster recovery of In-memory Trail Processor 402 on user space failures, maintaining constraints of storage footprint on the host. Event Forwarder 405 forwards events transactionally in a monotonically increasing sequence from In-memory Trail Processor 402 to central service 100 through a publisher/subscriber broker. Response Receiver 406 receives response events from the central service 100, and Response Handler 407 addresses such response events.

In addition to the foregoing primary components, agent 400 includes auxiliary components including Bootstrap 408, which bootstraps the agent 400 after deployment and/or recovery, as well as collects an initial snapshot of the host system state to assist in local trail identifier assignments. System Snapshot Forwarder 409 periodically forwards system snapshots to the central service 100 to identify live entities in (distributed) execution trails. Metrics Forwarder 410 periodically forwards agent metrics to the central service 100 to demonstrate agent resource consumption to end users. Discovery Event Forwarder 411 forwards a heartbeat to the central service 100 to assist in agent discovery, failure detection, and recovery.

Figure 5:
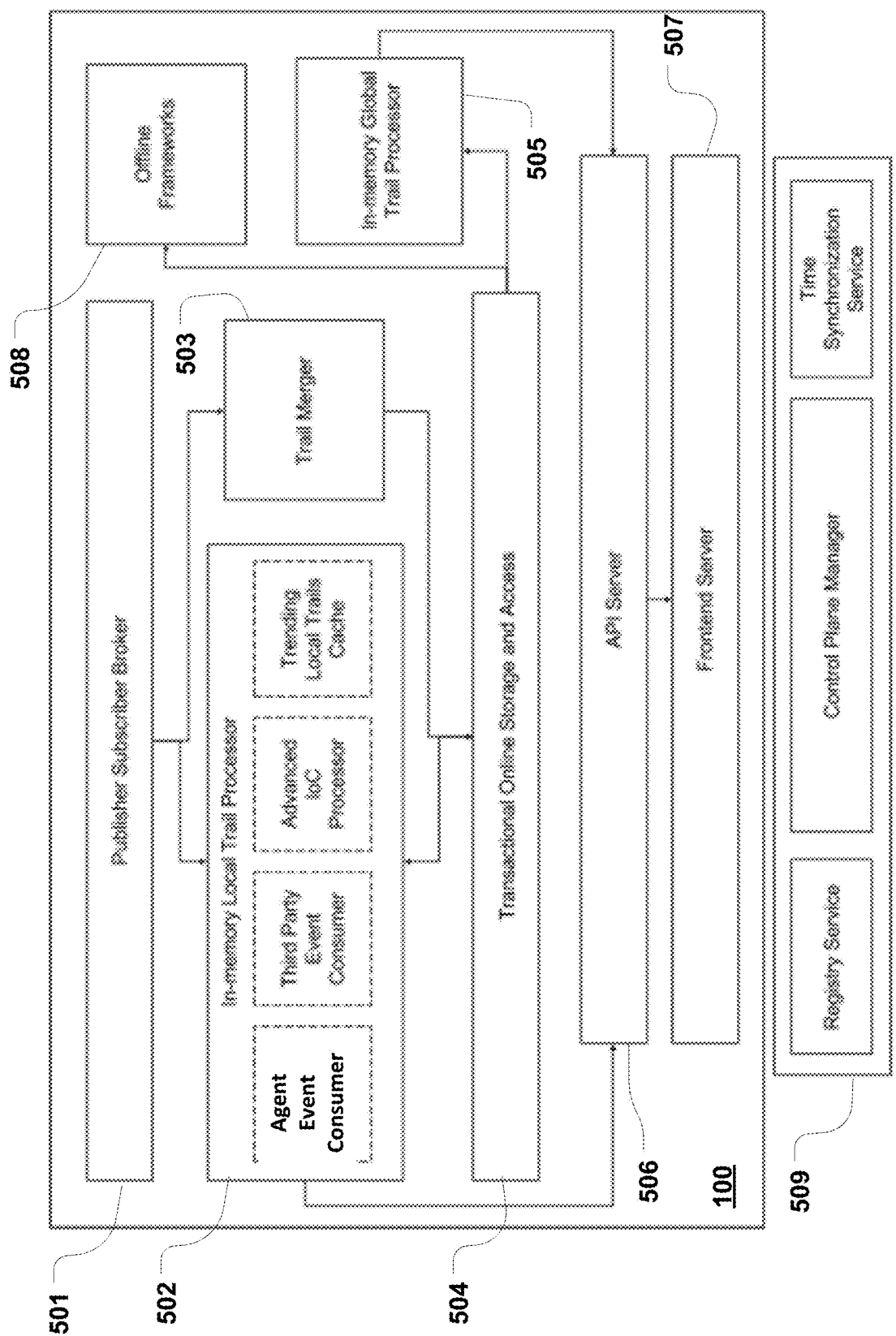
FIG. 5 depicts one implementation of a central service architecture in an attack progression tracking system.

FIG. 5 depicts an example architecture of the central service 100. In one implementation, unlike agent modules that are deployed on host/guest operating systems, central service 100 modules are scoped inside a software managed service. The central service 100 includes primarily online modules, as well as offline frameworks. The online modules of the central service 100 will now be described.

Publisher/Subscriber Broker 501 provides horizontally scalable persistent logging of execution trail events published from agents and third-party solutions that forward events tagged with host operating system information. In-memory Local Trail Processor 502 is a horizontally scalable in-memory component that is responsible for the consumption of local trail events that are associated with individual agents and received via the Publisher/Subscriber Broker 501. In-memory Local Trail Processor 502 also consumes third party solution events, which are applied to local trails. In-memory Local Trail Processor 502 further includes an in-memory local trail deep processor subcomponent with advanced IoC processing, in which complex behavior detection functions are used to determine IoCs at multi-depth sub-local trail levels. Such deep processing also includes sub-partitioning of local trails to assist in lightweight visualizations, risk scoring of IoC subpartitions, and re-scoring of local trails as needed. In addition, In-memory Local Trail Processor 502 includes a trending trails cache that serves a set of local trail data (e.g., for top N local trails) in multiple formats, as needed for front end data visualization.

Trail Merger 503 performs stateful unification of local trails across multiple agents to form global trails. This can include the explicit continuation of trails (to form global trails) based on scenarios of inter-host operating system process communication and scenarios of inter-host operating system manipulation of artifacts (e.g., process in <"host": "B", "local trail":"123"> uses a network shared file that is part of <"host":"A", "local trail":"237">). Trail Merger 503 assigns unique identifiers to global trails and assigns membership to the underlying local trails.

Transactional Storage and Access Layer 504 is a horizontally-scalable, consistent, transactional, replicated source of truth for local and global execution trails, provision for flexible schema, flexible indexing, low latency Create/Read/ Update operations, time to live semantics, and time range partitioning. In-memory Global Trail Processor 505 uses change data captured from underlying transactional storage to rescore global trails when their underlying local trails are rescored. This module is responsible for forwarding responses to agents on affected hosts, and also maintains a (horizontally-scalable) retain-best cache for a set of global trails (e.g., top N trails). API Server 506 follows a pull model to periodically retrieve hierarchical representations of the set of top N trails (self-contained local trails as well as underlying local trails forming global trails). API Server 506 also serves as a spectator of the cache and storage layer control plane. Frontend Server 507 provides a user-facing web application that provides the visualization functionality described herein.

Central service 100 further includes Offline Frameworks 508, including a behavioral model builder, which ingests incremental snapshots of trail edges from a storage engine and creates probabilistic n-gram models of intra-host process executions, local and network file manipulations, intra- and cross-host process connections. This framework supports API parallelization as well as horizontal scalability. Offline Frameworks 508 further include search and offline reports components to support search and reporting APIs, if required. This framework supports API parallelization as well as horizontal scalability.

Auxiliary Modules 509 in the central service 100 include a Registry Service that serves as a source of truth configuration store for global and local execution trail schemas, static IoC functions, and learned IoC behavioral models; a Control Plane Manager that provides automatic assignment of in-memory processors across multiple servers, agent failure detection and recovery, dynamic addition of new agents, and bootstrapping of in-memory processors; and a third party Time Synchronization Service that provides consistent and accurate time references to a distributed transactional storage and access layer, if required.

Connection Tracing

Because attacks progress gradually across multiple systems, it is difficult to map which security violations are related on distributed infrastructure. Whereas human analysts would normally manually stitch risk signals together through a labor-intensive process, the presently described attack progression tracking system facilitates the identification of connected events.

In modern systems, a process often communicates with another process via connection-oriented protocols. This involves (1) an initiator creating a connection and (2) a listener accepting the request. Once a connection is established, the two processes can send and/or receive data between them. An example of this is the TCP connection protocol. One powerful way to monitor an attacker's movement across infrastructure is to closely follow the connections between processes. In other words, the connections between processes can be identified, it is possible to determine how the attacker has advanced through the infrastructure.

Agents match connecting processes by instrumenting connect and accept system calls on an operating system. These events are represented in an execution graph as edges. Such edges are referred to herein as "atomic" edges, because there is a one-to-one mapping between a system call and an edge. Agents are able to follow two kinds of connections: local and network. Using a TCP network connection as an example, an agent from host A instruments a connect system call from process X, producing a mapping:

X→<senderIP:senderPort,receiverIP:receiverPort>

The agent from host B instruments an accept system call from process Y, producing a mapping:

Y→senderIP:senderPort,receiverIP:receiverPort>

The central service, upon receiving events from both agents A and B, determines that there is a matching relationship between the connect and accept calls, and records the connection mapping between X→Y.

Now, using a Unix domain socket local host connection as an example, an agent from host A instruments a connect system call from process X, producing a mapping:

X→<socket path, kaddr sender struct, kaddr receiver struct>

Here, kaddr refers to the kernel address of the internal address struct, each unique per sender and receiver at the time of connection. The agent from the same host A instruments an accept system call from process Y, producing a mapping:

Y→<socket path, kaddr sender struct, kaddr receiver struct>

The central service, upon receiving both events from agent A, determines that there is a matching relationship between the connect and accept calls, and records the connection mapping between X→Y.

Figure 6:
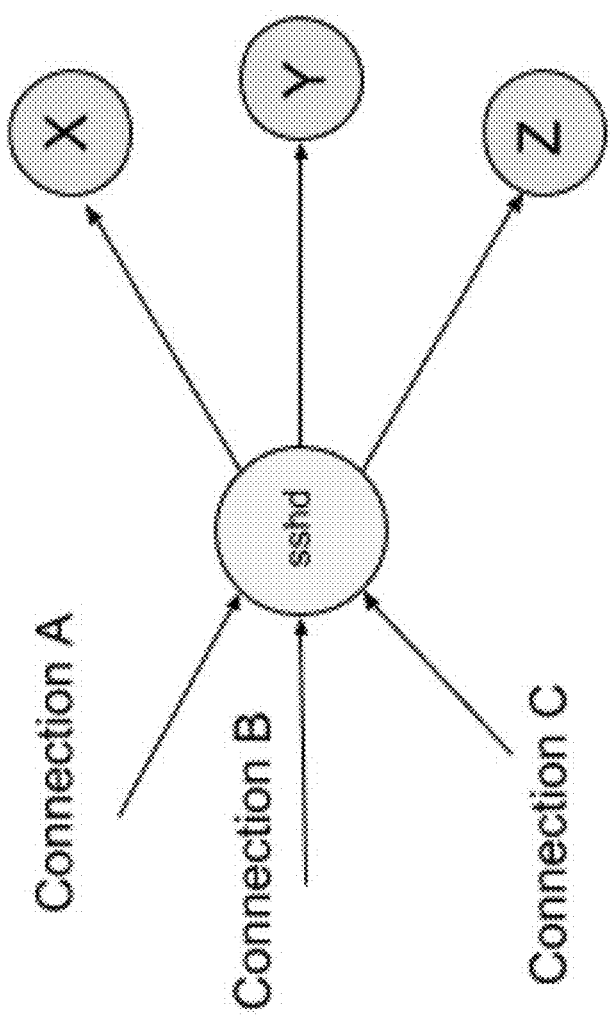
FIG. 6 depicts example connection multiplexing and resulting processes.

Many network-facing processes follow the pattern of operating as a server. A server process accepts many connections simultaneously and performs actions that are requested by the clients. In this particular case, there is a multiplexing relationship between incoming connections and their subsequent actions. As shown in FIG. 6, a secure shell daemon (sshd) accepts three independent connections (connections A, B, and C), and opens three individual sessions (processes X, Y, and Z). Without further information, an agent cannot determine exactly which incoming connections cause which actions (processes). The agent addresses this problem by using "implied" edges. Implied edges are different from atomic edges, in that they are produced after observing a certain number N of system events. Agents are configured with state machines that are advanced as matching events are observed at different stages. When a state machine reaches a terminal state, an implied edge is produced. If the state machine does not terminate by a certain number M of events, the tracked state is discarded.

There are two implied edge types that are produced by agents: hands-off implied edges and session-for implied edges. A hands-off implied edge is produced when an agent observes that a parent process clones a child process with an intent to handing over a network socket that it received. More specifically, an agent looks for the following behaviors using its state machine:
1) Parent process accepts a connection,
2) As a result of the accept ( ), the parent process obtains a file descriptor.
3) Parent process forks a child process.
4) The file descriptor from the parent is closed, leaving only the duplicate file descriptor of the child accessible.

A session-for implied edge is produced when an agent observes a worker thread taking over a network socket that has been received by another thread (typically, the main thread). More specifically, an agent looks for the following behaviors using its state machine:
1) The main thread from a server accepts a connection and obtains a file descriptor.
2) One of the worker threads from the same process starts read ( ) or recvfrom ( ) (or analogous functions) on the file descriptor.

To summarize, using the foregoing techniques, agents can identify relationships between processes initiating connections and subsequent processes instantiated through multiplexing servers by instrumenting which process or thread is handed an existing network socket.

The central service can consume the atomic and the implied edges to create a trail that tracks the movement of an attacker, which is, in essence, a subset of all the connections that are occurring between processes. The central service has an efficient logic which follows a state transition, as well. By employing both of the techniques above, it can advance the following state machine:
1) Wait for a connect ( ) or accept ( ) record event (e.g., in hash table).
2) Wait for matching connect ( ) or accept ( )
3) If the proximity of the timestamps of the events is within a threshold, record as a match between sender and receiver.
4) Optionally, wait for an additional implied edge.
5) If the implied edge arrives within a threshold amount of time, record as a match between a sender and a subsequent action.

Execution Trail Identification

Figure 7:
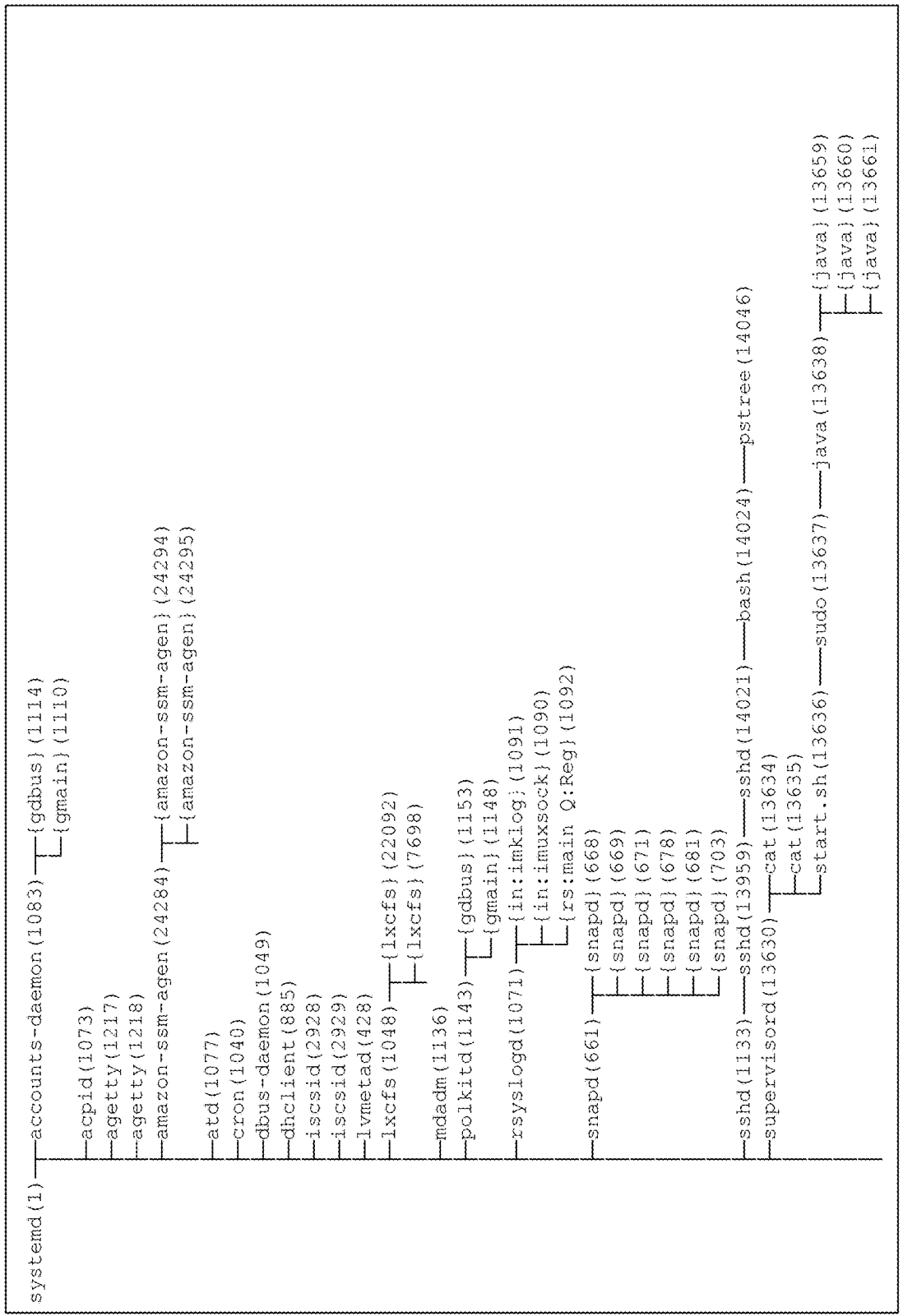
FIG. 7 depicts an example process tree dump on a Linux operating system.

The execution graphs each agent produces can be extensive in depth and width, considering they track events for a multitude of processes executing on an operating system. To emphasize this, FIG. 7 depicts a process tree dump for a single Linux host. An agent operating on such a host would instrument the system calls associated with the numerous processes. Further still, there are usually multiple daemons servicing different requests throughout the lifecycle of a system.

A large execution graph is difficult to process for two reasons. First, the virtually unbounded number of vertices and edges prevents efficient pattern matching. Second, grouping functionally unrelated tasks together may produce false signals during security analysis. To process the execution graph more effectively, the present system partitions the graph into one or more execution trails. In some implementations, the graph is partitioned such that each execution trail (subgraph) represents a single intent or a single unit of work. An "intent" can be a particular purpose, for example, starting a file transfer protocol (FTP) session to download a file, or applying a set of firewall rules. A "unit of work" can be a particular action, such as a executing a scheduled task, or executing a process in response to a request.

Figure 8:
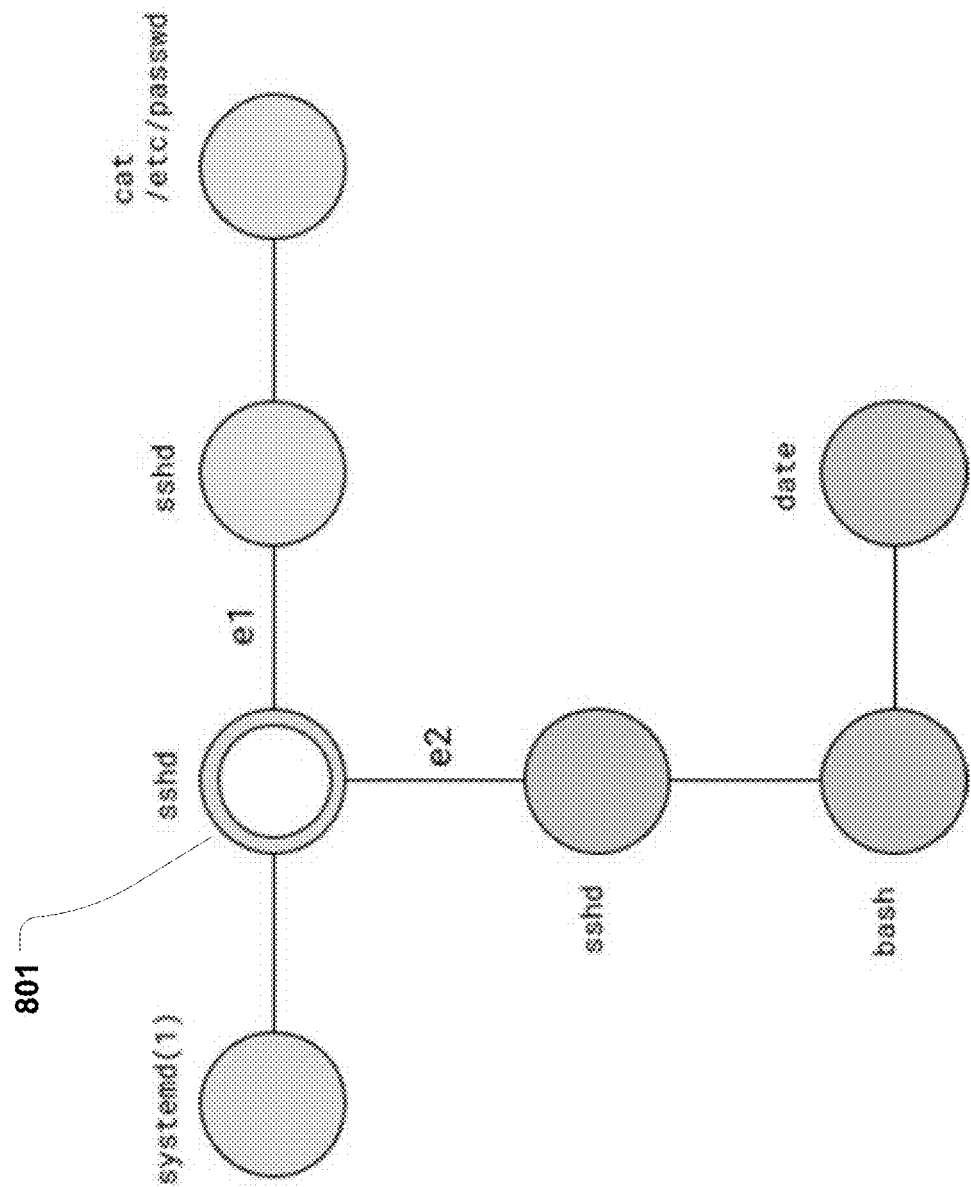
FIG. 8 depicts an example of partitioning an execution graph.

"Apex points" are used to delineate separate, independent partitions in an execution graph. Because process relationships are hierarchical in nature, a convergence point can be defined in the graph such that any subtree formed afterward is considered a separate independent partition (trail). As such, an Apex point is, in essence, a breaking point in an execution graph. FIG. 8 provides an example of this concept, in which a secure shell daemon (sshd) 801 services two sessions e1 and e2. Session e1 is reading the/etc/passwd file, whereas the other session e2 is checking the current date and time. There is a high chance that these two sessions belong to different individuals with independent intents. The same logic applies for subsequent sessions created by the sshd 801.

A process is determined to be an Apex point if it produces sub-graphs that are independent of each other. In one implementation, the following rules are used to determine whether an Apex point exists: (1) the process is owned directly by the initialization process for the operating system (e.g., the "init" process); or (2) the process has accepted a connection (e.g., the process has called accept ( ) on a socket (TCP, UDP, Unix domain, etc.)). If a process meets one of the foregoing qualification rules, it is likely to be servicing an external request. Heuristically speaking, it is highly that such processes would produce subgraphs with different intents (e.g., independent actions caused by different requests).

Risk Scoring

Figure 9:
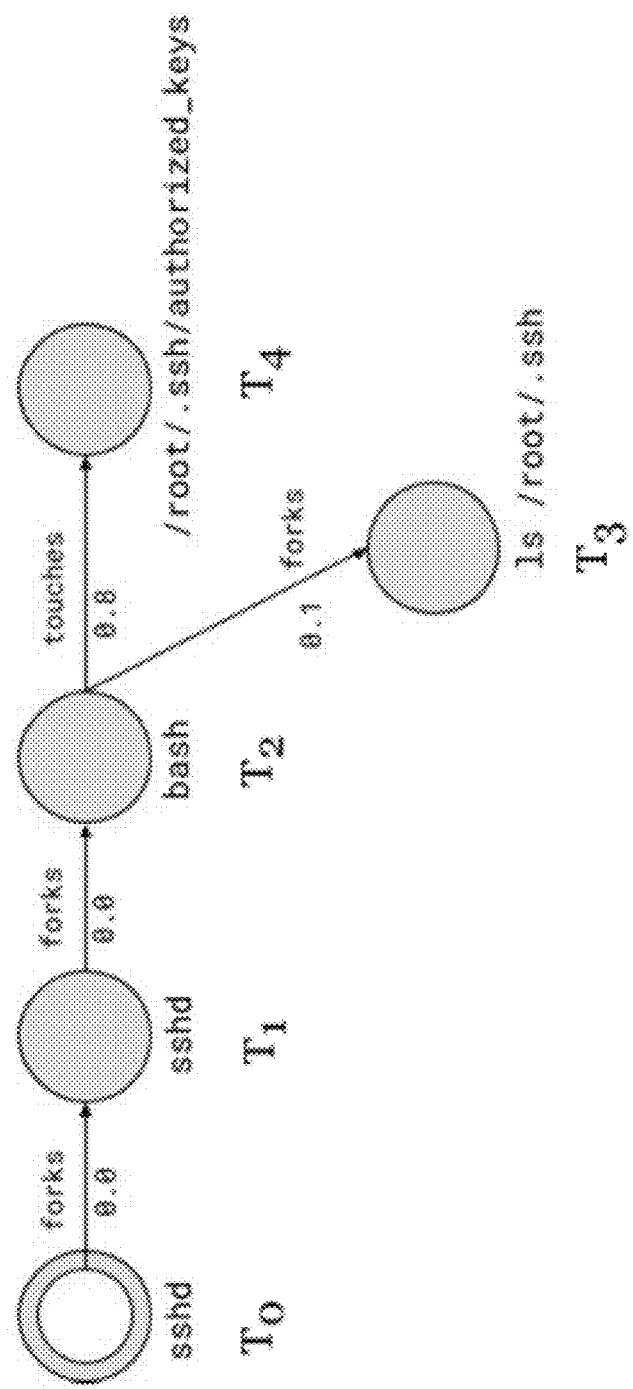
FIG. 9 depicts an example of risking scoring an execution trail.

After the execution graphs are partitioned as individual trails, security risks associated with each subgraph can be identified. Risk identification can be performed by the central service and/or individual agents. FIG. 9 is an execution graph mapping a sequence of action for a particular trail happening across times $T_0$ to $T_4$. At $T_0$, sshd forks a new sshd session process, which, at $T_1$, forks a shell process (bash). At $T_3$, a directory listing command (ls) is executed in the shell. At $T_4$, the /root/.ssh/authorized_keys file is accessed. The central service processes the vertices and edges of the execution graph and can identify malicious activities on four different dimensions: (1) frequency: is something repeated over a threshold number of times?; (2) edge: does a single edge match a behavior associated with risk?; (3) path: does a path in the graph match a behavior associated with risk?; and (4) cluster: does a cluster (subtree) in the graph contain elements associated with risk?

Risks can be identified using predefined sets of rules, heuristics, machine learning, or other techniques. Identified risky behavior (e.g., behavior that matches a particular rule, or is similar to a learned malicious behavior) can have an associated risk score, with behaviors that are more suspicious or more likely to malicious having higher risk scores than activities that may be relatively benign. In one implementation, rules provided as input to the system are sets of one or more conditional expressions that express system level behaviors based on operating system call event parameters. These conditions can be parsed into abstract syntax trees. In some instances, when the conditions of a rule are satisfied, the matching behavior is marked as an IoC, and the score associated with the rule is applied to the marked behavior. The score can be a predefined value (see examples below). The score can be defined by a category (e.g., low risk, medium risk, high risk), with higher risk categories having higher associated risk scores.

The rules can be structured in a manner that analyzes system level activities on one or more of the above dimensions. For example, a frequency rule can include a single conditional expression that expresses a source process invoking a certain event multiple times aggregated within a single time bucket and observed across a window comprising multiple time buckets. As graph events are received at the central service from individual agents, frequencies of events matching the expressions can be cached and analyzed online. Another example is an event (edge) rule, which can include a single conditional expression that expresses an event between two entities, such as process/thread manipulating process, process/thread manipulating file, process/thread manipulating network addresses, and so on. As graph events are streamed from individual sensors to the central service, each event can be subjected to such event rules for condition match within time buckets. As a further example, a path rule includes multiple conditional expressions with the intent that a subset of events taking place within a single path in a graph demonstrate the behaviors encoded in the expressions. As events are streamed into the central service, a unique algorithm can cache the prefix expressions. Whenever an end expression for the rule is matched by an event, further asynchronous analysis can be performed over all cached expressions to check whether they are on the same path of the graph. An identified path can be, for example, process A executing process B, process C executing process D, and so on. Another example is a cluster rule, which includes multiple conditional expressions with the intent that a subset of events taking place across different paths in a graph demonstrates the behaviors encoded in the expressions. Lowest common ancestors can be determined across the events matching the expressions. One of skill will appreciate the numerous ways in which risks can be identified and scored.

As risks are identified, the central service tracks the risk score at the trail level. Table 1 presents a simple example of how a risk score accumulates over time, using simple edge risks, resulting in a total risk for the execution trail of 0.9.

TABLE 1

| Time | Risk Score | Event Description |
| --- | --- | --- |
| $T_0$ | 0.0 | Process is owned by init, likely harmless |
| $T_1$ | 0.0 | New ssh session |
| $T_2$ | 0.0 | Bash process, likely harmless |

TABLE 1-continued

| Time | Risk Score | Event Description |
| --- | --- | --- |
| $T_3$ | 0.1 (+0.1) | View root/.ssh dir-potentially suspicious |
| $T_4$ | 0.9 (+0.8) | Modification of authorized_keys-potentially malicious |

In some implementations, risk scores for IoCs are accumulated to the underlying trails as follows. Certain IoCs are considered "anchor" IoCs (i.e., IoCs that are independently associated with risk), and the risk scores of such anchor IoCs are added to the underlying trail when detected. The scores of "dependent" IoCs are not added to the underlying trail if an anchor IoC has not previously been observed for the trail. A qualifying anchor IoC can be observed on the same machine or, if the trail has laterally moved, on a different machine. For example, the score of a privilege escalation function like sudo su may not get added to the corresponding trail unless the trail has seen an anchor IoC. Finally, the scores of "contextual" IoCs are not accumulated to a trail until the score of the trail has reached a particular threshold.

Global Trails

Using the connection matching techniques described above, the central service can form a larger context among multiple systems in an infrastructure. That is, the central service can piece together the connected trails to form a larger aggregated trail (i.e., a global trail). For example, referring back to FIG. 3, if a process from trail 201 (on the host associated with agent A) makes a connection to a process from trail 203 (on the host associated with agent C), the central service aggregates the two trails in a global trail 301. The risk scores from each local trail 201 and 203 (as well as 202) can be combined to form a risk score for the new global trail 301. In one implementation, the risk scores from the local trails 201, 202, and 203 are added together to form the risk score for the global trail 301. Global trails form the basis for the security insights provided by the system. By highlighting the global trails with a high-risk score, the system can alert and recommend actions to end users (e.g., security analysts).

Risk Influence Transfer

Figure 10:
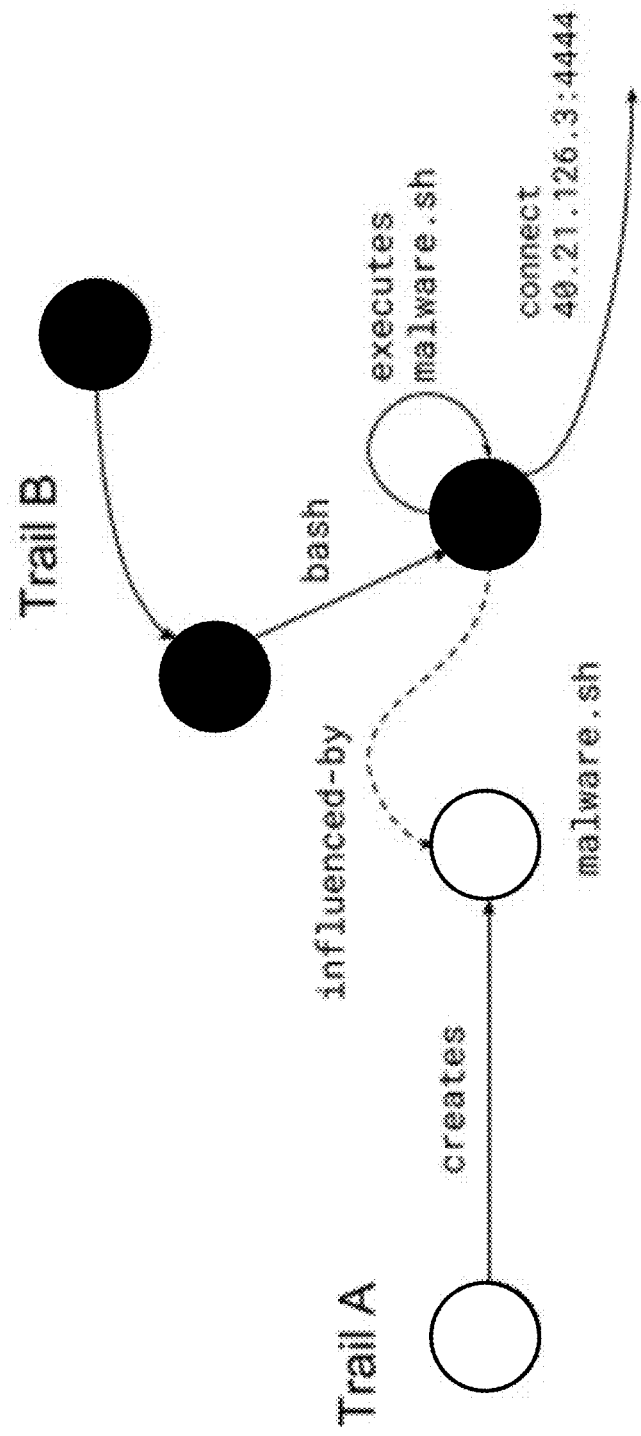
FIG. 10 depicts an example of an influence relationship between execution trails.

The partitioned trails in the execution graphs are independent in nature, but this is not to say that they do not interact with each other. On the contrary, the risk score of one trail can be affected by the "influence" of another trail. With reference to FIG. 10, consider the following example. Trail A (containing the nodes represented as circle outlines) creates a malicious script called malware.sh, and, at a later time, a different trail, Trail B (containing the nodes represented as solid black circles) executes the script. Although the two Trails A and B are independent of each other, Trail B is at least as risky as Trail A (because Trail B is using the script that Trail A has created). This is referred to herein as an "influence-by" relationship.

In one implementation, a trail is "influenced" by the risk score associated with another trail when the first trail executes or opens an artifact produced by the other trail (in some instances, opening an artifact includes accessing, modifying, copying, moving, deleting, and/or other actions taken with respect to the artifact). When the influence-by relationship is formed, the following formula is used so that the risk score of influencer is absorbed.

$$RB = (1-\alpha) \cdot RB + \alpha \cdot \text{Rinfluencer} \qquad \text{Equation 1}$$

In the above formula, RB is the risk score associated with Trail B, Rinfluencer is the risk score associated with the influencer (malware script), and $\alpha$ is a weighting factor between 0 and 1.0. The exact value of $\alpha$ can be tuned per installation and desired sensitivity. The general concept of the foregoing is to use a weighted running average (e.g., exponential averaging) to retain a certain amount of the risk score of the existing trail (here, Trail B), and absorb a certain amount of risk score from the influencer (here, malware.sh).

Two risk transfers occur in FIG. 10: (1) a transfer of risk between Trail A and a file artifact (malware.sh) during creation of the artifact, and (2) a transfer of risk between the file artifact (malware.sh) and Trail B during execution of the artifact. When an artifact (e.g., a file) is created or modified (or, in some implementations, another action is taken with respect to the artifact), the risk score of the trail is absorbed into the artifact. Each artifact maintains its own base risk score based on the creation/modification history of the artifact.

Figure 11:
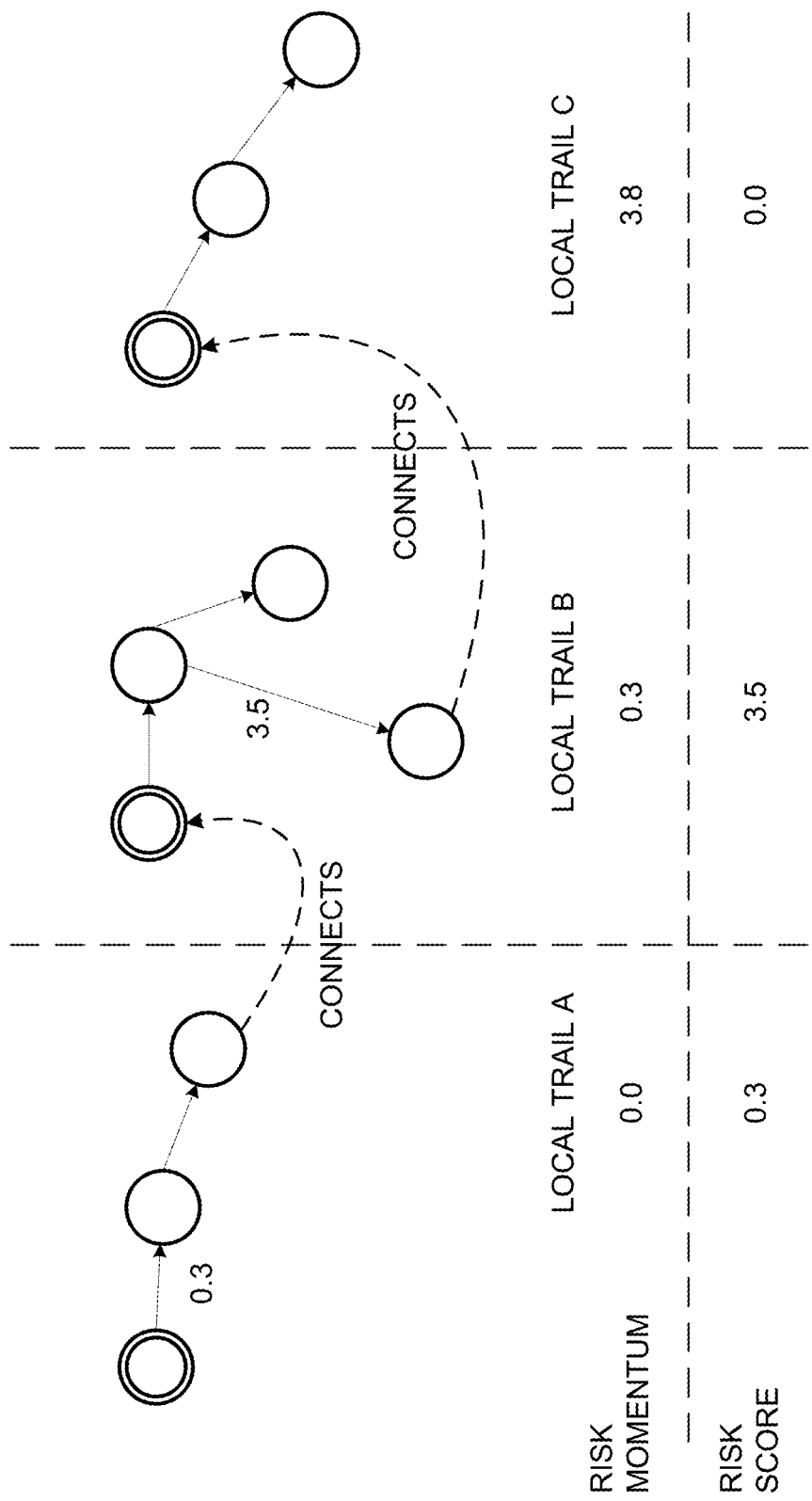
FIG. 11 depicts an example of risk momentum across multiple execution trails.

To further understand how trail risk transfer is performed, the concept of "risk momentum" will now be explained. Risk momentum is a supplemental metric that describes the risk that has accumulated thus far beyond a current local trail. In other words, it is the total combined score for the global trail. An example of risk momentum is illustrated in FIG. 11. As shown, Local Trail A, Local Trail B, and Local Trail C are connected to form a continuous global execution trail. Using the techniques described above, Local Trail A is assigned a risk score of 0.3 and Local Trail B has a risk score of 3.5. Traversing the global execution trail, the risk momentum at Local Trail B is 0.3, which is the accumulation of the risk scores of preceding trails (i.e., Local Trail A). Going further, the risk momentum at Local Trail C is 3.8, which is the accumulation of the risk scores of preceding Local Trails A and B.

It is possible that a local execution trail does not exhibit any risky behavior, but its preceding trails have accumulated substantial risky behaviors. In that situation, the local execution trail has a low (or zero) risk score but has a high momentum. For example, referring back to FIG. 11, Local Trail C has a risk score of zero, but has a risk momentum of 3.8. For this reason, both the risk momentum and risk score are considered when transferring risk to an artifact. In one implementation, risk is transferred to an artifact using the following formula:

$$\text{ArtifactBase} = (\text{RiskMomentum} + \text{RiskScore}) \cdot \beta \qquad \text{Equation 2}$$

That is, the base risk score for an artifact (ArtifactBase) is calculated by multiplying a constant $\beta$ to the sum of the current risk momentum (RiskMomentum) and risk score of the current execution trail (RiskScore). $\beta$ is a weighting factor, typically between 0.0 and 1.0. Using the above equation, a local execution trail may not exhibit risky behavior as a given moment, but such trail can still produce a non-zero artifact base score in the risk momentum is non-zero.

A trail that then accesses or executes an artifact is influenced by the base score of the artifact, per Equation 1, above (Rinfluencer is the artifact base score). Accordingly, although trails are partitioned in nature, risk scores are absorbed and transferred to each other through influence-by relationships, which results in the system providing an accurate and useful depiction of how risk behaviors propagate through infrastructure.

Remote Connection Lateral Movement Tracing

Using the techniques described herein, an attacker's lateral movement from one or more source machines to one or more target machines over Remote Desktop Protocol (RDP) can be identified and tracked in execution trails. Multiple RDP sessions can source from different clients for the same logon, and the hub (central service) can track this behavior to detect lateral movement and construct continuing execution trails representing a sequence of attacks.

In one implementation, detection of RDP lateral movement is a two-part process. In part one, RDP and logon events are collected in real-time. As earlier discussed, agents listen for various events on local systems. These events can include remote network connection events, such as events indicating the occurrence of an RDP logon or an RDP reconnect to an existing session. In part two, the hub uses the events and/or local execution trails built by the agents to construct a remote network connection activity map. This map, in combination with other system events, is used to build an execution graph representing historical attack progression and trail continuation when an attacker moves from one client to another, establishing multiple remote network connection (e.g., RDP) sessions over a period of time.

With respect to part one, an agent can generate an RDP logon or RDP reconnect event after processing a set of RDP and logon events. An RDP logon can be indicated by the following set of Microsoft Windows events: TCP Accept, RDP Event Id 131, 65, 66, Logon Event Id 4624-1, 4624-2. Using example connection data for purposes of illustration, the data fields for these events can include the following information.

TCP Accept
<Data Name="LocalAddr">192.168.137.10</Data>
<Data Name="LocalPort">3389</Data>
<Data Name="RemoteAddr">192.168.137.1</Data>
<Data Name="RemotePort">52732</Data>
RDP Event Id 131
<Data Name="ConnType">TCP</Data>
<Data Name="ClientIP">192.168.137.1:52732</Data>
RDP Event Id 65: This event immediately follows RDP Event Id 131 and can be used to connect IP/port to ConnectionName.
<Data Name="ConnectionName">RDP-Tcp#3</Data>
RDP Event Id 66: This event indicates the RDP connection is complete.
<Data Name="ConnectionName">RDP-Tcp#3</Data>
<Data Name="SessionID">3</Data>
Logon Events 4624: Two logon events are generated. The events can be evaluated based on the "LogonType" field. LogonType=10 (Remote logon) or 3 (Network) indicates a remote logon.
4624->1 (Elevated token)
<Data Name="TargetUserSid">S-1-5-21-718463290-3469430964-1999076920-500</Data>
<Data Name="TargetUserName">administrator</Data>
<Data Name="TargetDomainName">DEV</Data>
<Data Name="TargetLogonId">0x8822cc</Data>
<Data Name="LogonType">10</Data>
<Data Name="LogonProcessName">User32</Data>
<Data Name="AuthenticationPackageName">Negotiate</Data>
<Data Name="WorkstationName">WIN2012R2-VM</Data>
<Data Name="LogonGuid">{136CFB45-A479-0071-9C2E-E52D5C4B70C7}</Data>
<Data Name="TransmittedServices">-</Data>
<Data Name="LmPackageName">-</Data>
<Data Name="KeyLength">0</Data>
<Data Name="ProcessId">0x1040</Data>
<Data Name="ProcessName">C:\Windows\System32\winlogon.exe</Data>
<Data Name="IpAddress">192.168.137.1</Data>
<Data Name="IpPort">0</Data>

<Data Name="TargetUserSid">S-1-5-21-718463290-3469430964-1999076920-500</Data>
<Data Name="TargetUserName">administrator</Data>
<Data Name="TargetDomainName">DEV</Data>
<Data Name="TargetLogonId">0x8822de</Data>
<Data Name="LogonType">10</Data>
<Data Name="LogonProcessName">User32</Data>
<Data Name="AuthenticationPackageName">Negotiate</Data>
<Data Name="WorkstationName">WIN2012R2-VM</Data>
<Data Name="LogonGuid">{136CFB45-A479-0071-9C2E-E52D5C4B70C7}</Data>
<Data Name="TransmittedServices">-</Data>
<Data Name="LmPackageName">-</Data>
<Data Name="KeyLength">0</Data>
<Data Name="ProcessId">0x1040</Data>
<Data Name="ProcessName">C:\Windows\System32\winlogon.exe</Data>
<Data Name="IpAddress">192.168.137.1</Data>
<Data Name="IpPort">0</Data>

By connecting data from the foregoing events (TcpAccept, RDP Event Id 131, 65 and 66, and Logon Events 4624), it can be determined that an RDP logon event has been initiated with the following attributes:
Remote Client Address=192.168.137.1:52732
Local Address=192.168.137.10:3389
ConnectionName=RDP-Tcp#3
SessionID=3
Elevated LogonId=0x8822cc (privileged)
TargetLogonId=0x8822de An RDP reconnect event includes the same events as an RDP logon event, with the addition of a session reconnect event (Event Id 4778). The session reconnect event describes the previous logon session that has been taken over by the new RDP connection, and can include the following data fields:
Other logon Event Id 4778
<Data Name="AccountName">administrator</Data>
<Data Name="AccountDomain">DEV</Data>
<Data Name="LogonID">0x6966ee</Data>
<Data Name="SessionName">RDP-Tcp#3</Data>
<Data Name="ClientName">RUSHILT</Data>
<Data Name="ClientAddress">192.168.137.1</Data>
Based on this event (Event Id 4778), the agent obtains the LogonID and Elevated LogonID for the previously existing session which has been taken over by the new RDP connection.

Figure 12:
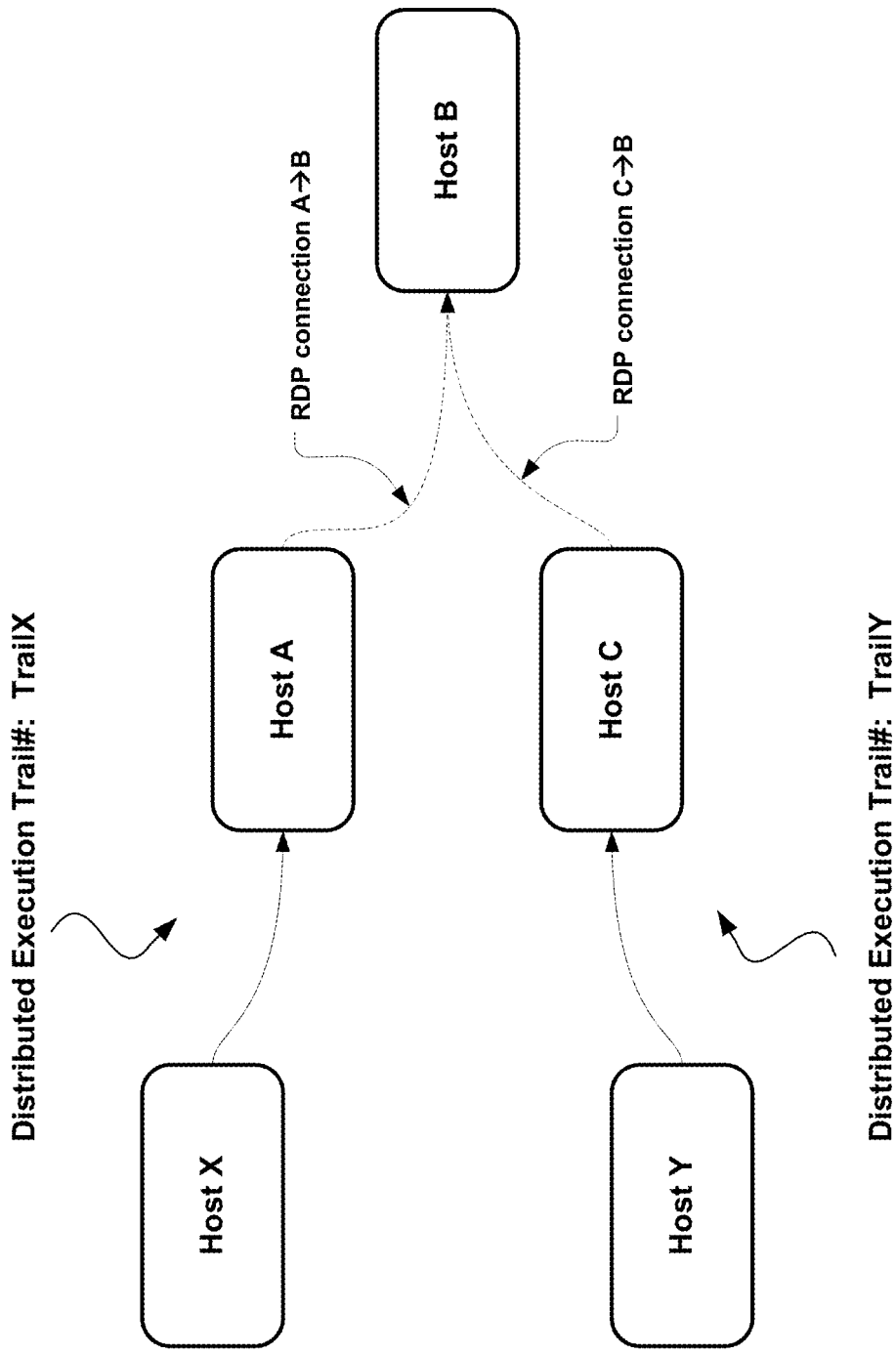
FIG. 12 depicts an example scenario of progression execution continuation through RDP.

Because the nature of RDP-based lateral movements is unique compared to typical client-server based movements, an execution trail continuation algorithm is used to union (merge) execution graphs tracking RDP-based activity. For purposes of illustration, FIG. 12 depicts an example scenario for RDP-based trail continuation. In this scenario, a benign activity progression starts from Host X in the infrastructure, continues to Host A through a non-RDP lateral movement technique, and connects to Host B using an RDP client on Host A resulting in creating a new RDP logon session on Host B. A subsequent malicious activity progression starts from Host Y, continues to Host C, and connects to Host B using the same logon credentials, thereby reconnecting over the existing RDP logon session started by the previous progression. The outcome of the execution trail continuation algorithm is two-fold: 1) future actions in the new logon session created by Host A are merged/unioned/continued with actions that have taken place in the progression trail (Host X→Host A→Host B) designated as "TrailX," and 2)

future actions in the existing logon session after the reconnect from Host C are merged/unioned/continued with actions that have taken place in the progression trail (Host Y→Host C→Host B) designated as "TrailY."

Figure 13A:
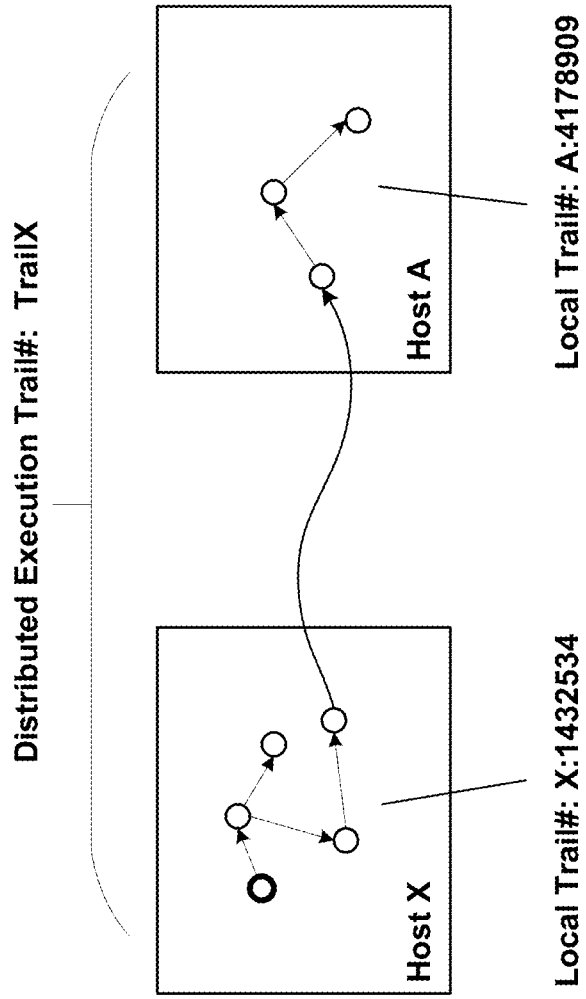
FIGS. 13A-13D depict example distributed execution trails through RDP logon and reconnect events.
Figure 13B:
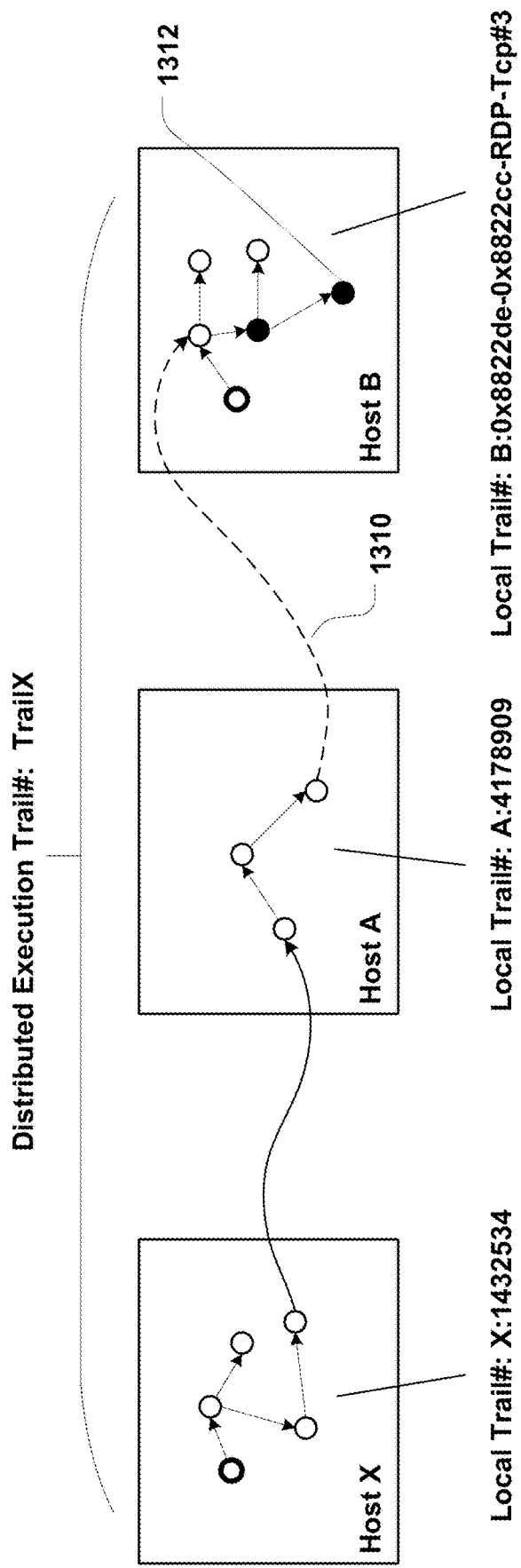

FIGS. 13A and 13B depict the progression of TrailX through the creation of the RDP logon session. FIG. 13A shows the state of a distributed execution graph containing the aforementioned distributed execution trail, TrailX, prior to lateral movement. In this stage, before the progression issues an RDP connection from Host A, the hub has already processed and constructed a distributed execution graph to model the progression from Host X to Host A.

Moving forward in time, an RDP client executing on Host A issues a process connect communication event (e.g., for an inter-process connection between hosts) to connect to Host B. The agent operating on Host A identifies the process connect communication event and transmits a representation of the event to the hub, which receives and caches the event representation through In-memory Local Trail Processor 502. To illustrate the present example, the connect event representation can have the following properties:

Local Trail identifier: A:4178909
TCP/IP tuple: 192.168.137.1:52732:192.168.137.10:3389

An RDP server executing on Host B hands off the incoming connection from Host A to a new logon session. The agent operating on Host B identifies the new session event and transmits a representation of the event to the hub, which receives and caches the event representation through In-memory Local Trail Processor 502. The new session event representation can have the following properties:

ConnectionName=RDP-Tcp#3
ElevatedLogonId=0x8822cc (privileged)
TargetLogonId=0x8822de
TCP/IP tuple: 192.168.137.1:52732:192.168.137.10:3389

The hub creates a local trail vertex in the form of host:TargetLogonId-ElevatedLogonId-ConnectionName. Trail Merger 503 in the hub then performs a distributed graph union find to create a graph edge 1310 between local trail A:4178909 and local trail B:0x8822de-0x8822cc-RDP-Tcp#3 (depicted in FIG. 13B). The resulting graph edge 1310 is assigned to distributed execution trail TrailX. The hub maintains a database backed in-memory key-value store of mappings between (1) TargetLogonId→TargetLogonId: ElevatedLogonId, (2) ElevatedLogonId→TargetLogonId:ElevatedLogonId, and (3) TargetLogonId:ElevatedLogonId→ConnectionName.

In one implementation, upon the creation of a new process in the new logon session on Host B, the following can occur. The hub receives an event from the agent on Host B identifying a process start edge event (i.e., an event associated with the creation of a graph edge between a parent process vertex and a child process vertex, signifying the launching of a new process). Local Trail Processor 502 caches the event until it receives a Windows audit event, AuditProcessCreate, signifying the creation of a process, from the same agent for the same process identifier associated with the process start edge event. The AuditProcessCreate event provides an ElevatedLogonId or a TargetLogonId, as well as an RDP session name (RDP-Tcp#3). A Window KProcessStart event associated with the creation of the process is also received from the agent. Following the arrival of both events, the hub consults the in-memory key-value store to retrieve logon metadata (TargetLogonId-ElevatedLogonId) and populates the same (in this example, 0x8822de-0x8822cc) in a vertex in the local execution trail (here, local trail B:0x8822de-0x8822cc-RDP-Tcp#3) associated with the process created in the new logon session. The current RDP connection identifier is assigned the local execution trail identifier (B:0x8822de-0x8822cc-RDP-Tcp#3) for the KProcessStart event.

The new process can continue execution within the logon session on Host B. Further execution continuation from the process (e.g., system activities relating to files, network connections, etc.) results in the creation of edges within the execution graph, and metadata from the graph vertex associated with the process is used to assign the local execution trail identifier (B:0x8822de-0x8822cc-RDP-Tcp#3) to the edges. The resulting distributed execution graph from the above events is illustrated in FIG. 13B. Future malicious behaviors (e.g., node 1312) exhibited from the logon session are attributed to global trail TrailX.

Figure 13C:
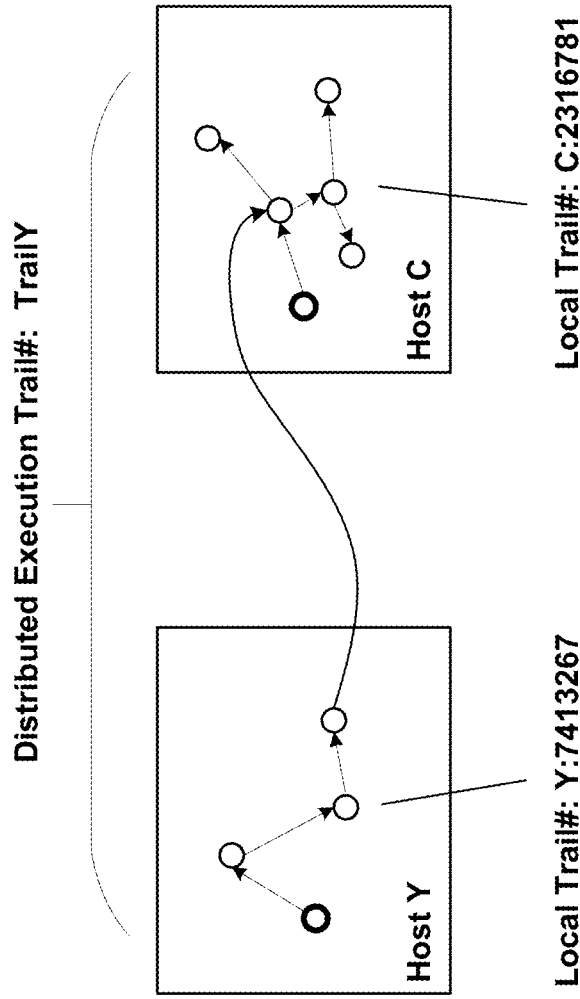
Figure 13D:
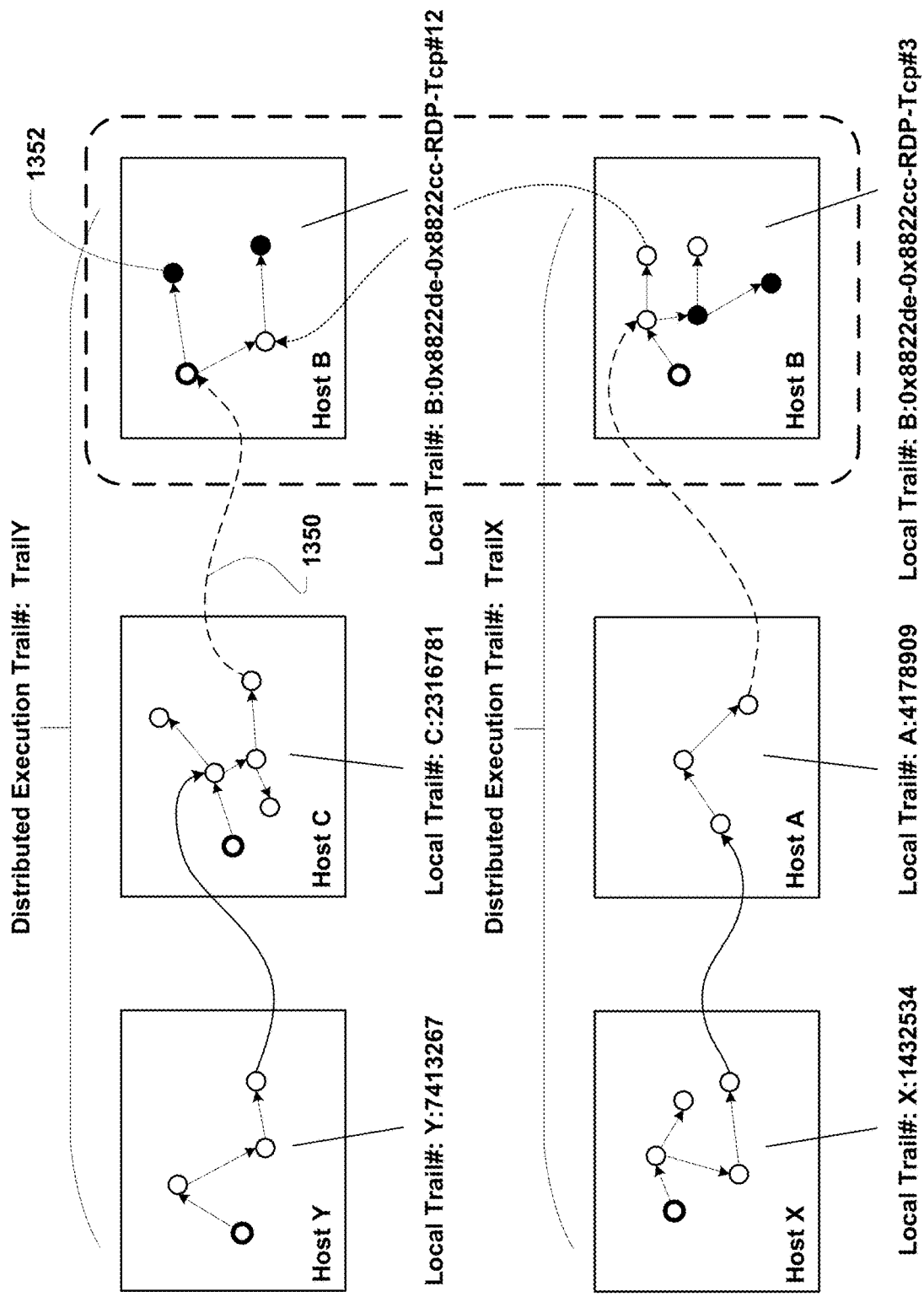

FIGS. 13C and 13D depict the progression of TrailY through reconnection to the RDP logon session created in TrailX. FIG. 13C shows the state of a distributed execution graph containing the aforementioned distributed execution trail, TrailY, prior to lateral movement. In this stage, before the progression issues an RDP connection from Host C, the hub has already processed and constructed a distributed execution graph to model the progression from Host Y to Host C.

Moving forward in time, an RDP client executing on Host C issues a process connect communication event (e.g., for an inter-process connection between hosts) to connect to Host B. The agent operating on Host C identifies the process connect communication event and transmits a representation of the event to the hub, which receives and caches the event representation through In-memory Local Trail Processor 502. To illustrate the present example, the connect event representation can have the following properties:

Local Trail identifier: C:2316781
TCP/IP tuple: 192.168.137.21:63732:192.168.137.10:3389

The RDP server executing on Host B hands off the incoming connection from Host C to the currently existing logon session with Host A. The agent operating on Host C identifies the initiation of the reconnect event and transmits a representation of the event to the hub, which receives and caches the reconnect event representation through In-memory Local Trail Processor 502. The reconnect event representation can have the following properties (because the existing logon session is reused, both TargetLogonId and ElevatedLogonId values remain the same):

ConnectionName=RDP-Tcp#2
ElevatedLogonId=0x8822cc (privileged)
TargetLogonId=0x8822de
TCP/IP tuple: 192.168.137.21:63732:192.168.137.10:3389

The hub creates a local trail vertex in the form of host:TargetLogonId-ElevatedLogonId-ConnectionName. Trail Merger 503 in the hub then performs a distributed graph union find to create a graph edge 1350 between local trail C:2316781 and local trail B:0x8822de-0x8822cc-RDP-Tcp#12 (depicted in FIG. 13D). The resulting graph edge 1350 is assigned to distributed execution trail TrailY. The hub updates the database backed in-memory key-value store of mappings between TargetLogonId:ElevatedLogonId→ConnectionName with the new RDP connection name.

After the session reconnect, upon the creation of a new process in the session on Host B, the following can occur. The hub receives an event from the agent on Host B identifying a process start edge event. Local Trail Processor 502 caches the event until it receives AuditProcessCreate and KProcessStart events from the same agent for the same process identifier associated with the process start edge event. The AuditProcessCreate event provides an ElevatedLogonId or a TargetLogonId, and provides an RDP session name (RDP-Tcp#12). Following the arrival of both events, the hub consults the in-memory key-value store to retrieve logon metadata (TargetLogonId-ElevatedLogonId) and populates the same (in this example, 0x8822de-0x8822cc) in a vertex in the local execution trail (here, local trail B:0x8822de-0x8822cc-RDP-Tcp#12) associated with the process created in the existing session. The current RDP connection identifier is assigned the local execution trail identifier (B:0x8822de-0x8822cc-RDP-Tcp#12) for the KProcessStart event.

The new process can continue execution within the existing session on Host B. Further execution continuation from the process (e.g., system activities relating to files, network connections, etc.) results in the creation of edges within the execution graph, and metadata from the graph vertex associated with the process is used to assign the local execution trail identifier (B:0x8822de-0x8822cc-RDP-Tcp#12) to the edges. The resulting distributed execution graph from the above events is illustrated in FIG. 13D. Future malicious behaviors (e.g., node 1352) exhibited from the logon session are attributed to global trail TrailY.

Multimodal Sources

In one implementation, the present system includes a multimodal security middleware architecture enhances execution graphs by supplementing the graphs with detection function results derived from multiple sources rather than a single source (e.g., events identified by agents executing on host systems). The multimodal security middleware is responsible for enhancing activity postures into security postures, in online, real-time, as well as near-real time fashion. Multimodal sources can include (1) rule based online graph processing analytics, (2) machine learning based anomaly detection, (3) security events reported from host operating systems, (4) external threat intelligence feeds, and (5) preexisting silo security solutions in an infrastructure. Detection results from each of these sources can be applied to the underlying trails, thereby contributing to the riskiness of an execution sequence developing towards an attack progression. Being multimodal, if an activity subset within an execution trail is detected as an indicator of compromise by multiple sources, the probability of false positives on that indicator of compromise is lowered significantly. Moreover, the multimodal architecture ensures that the probability of overlooking an indicator of compromise is low, as such indicators will often be identified by multiple sources. A further advantage of the multimodal architecture is that specific behaviors that cannot be expressed generically, such as whether a host should communicate to a particular target IP address, or whether a particular user should ever log in to a particular server, can be reliability detected by the system.

In one implementation, the multimodal middleware includes an online component and a nearline component. Referring back to FIG. 5, the online and nearline components can be included in In-memory Local Trail Processor 502. The online component includes a rule-based graph analytic processor subcomponent and a machine learning based anomaly detector subcomponent. The nearline component consumes external third-party information, such as third-party detection results and external threat intelligence feeds. As execution trails are modeled using host and network-based entity relationships, they are processed by the rule-based processor and machine learning based anomaly detector, which immediately assign risk scores to single events or sets of events. Information from the nearline components are mapped back to the execution trails in a more asynchronous manner to re-evaluate their scores. Some or all of the sources of information can contribute to the overall score of the applicable execution trails to which the information is applicable.

Security information from external solutions are ingested by the nearline component, and the middleware contextualizes the information with data obtained from sensors. For example, a firewall alert can take the form source ip:source port to target ip:target port traffic denied. The middleware ingests this alert and searches for a process network socket relationship from the subgraph, where the network socket matches the above source ip:source port, target ip:target port. From this, the middleware is able to determine to which trail to map the security event. The score of the event can be derived from the priority of the security information indicated by the external solution from which the information was obtained. For example, if the priority is "high", a high risk score can be associated with the event and accumulated to the associated trail.

Operating systems generally have internal detection capabilities. The middleware can ingest security events reported from host operating systems in the same manner described above with respect to the security information obtained from external solutions. The nearline component of the middleware is also able to ingest external threat intelligence feeds, such as alerts identifying process binary names, files, or network IP addresses as suspicious. The middleware can contextualize information received from the feeds by querying entity relationships to determine which events in which trails are impacted by the information. For example, if a particular network IP address is blacklisted, each trail containing an event associated with the IP (e.g., process connects to a socket where the remote IP address is the blacklisted address) can be rescored based on a priority set by the feed provider.

Within the online component, the rule-based graph stream processing analytics subcomponent works inline with streams of graph events that are emitted by system event tracking sensors executing on operating systems. This subcomponent receives a set of rules as input, where each rule is a set of one or more conditional expressions that express system level behaviors based on OS system call event parameters. The rules can take various forms, as described above.

The machine learning based anomaly detection subcomponent will now be described. In some instances, depending on workloads, certain behavioral rules cannot be generically applied on all hosts. For example, launching a suspicious network tool may be a malicious event generally, but it may be the case that certain workloads on certain enterprise servers are required to launch the tool. This subcomponent attempts to detect anomalies as well as non-anomalies by learning baseline behavior from each individual host operating system over time. It is to be appreciated that various known machine learning and heuristic techniques can be used to identify numerous types of anomalous and normal behaviors. Behaviors detected by the subcomponent can be in the form of, for example, whether a set of events are anomalous or not (e.g., whether process A launching process B is an anomaly when compared against the baseline behavior of all process relationships exhibited by a monitored machine). This detection method is useful in homogenous workload environments, where deviation from fixed workloads is not expected. Detected behaviors can also be in the form of network traffic anomalies (e.g., whether a host should communicate or receive communicate from a particular IP address) and execution anomalies (e.g., whether a source binary A should directly spawn a binary B, whether some descendant of source binary A should ever spawn binary B, etc.). The machine learning based anomaly detection subcomponent provides a score for anomalies based on the standard deviation from a regression model. The score of a detected anomaly can be directly accumulated to the underlying trail.

Computer-Based Implementations

In some examples, some or all of the processing described above can be carried out on a personal computing device, on one or more centralized computing devices, or via cloud-based processing by one or more servers. In some examples, some types of processing occur on one device and other types of processing occur on another device. In some examples, some or all of the data described above can be stored on a personal computing device, in data storage hosted on one or more centralized computing devices, or via cloud-based storage. In some examples, some data are stored in one location and other data are stored in another location. In some examples, quantum computing can be used. In some examples, functional programming languages can be used. In some examples, electrical memory, such as flash-based memory, can be used.

Figure 14:
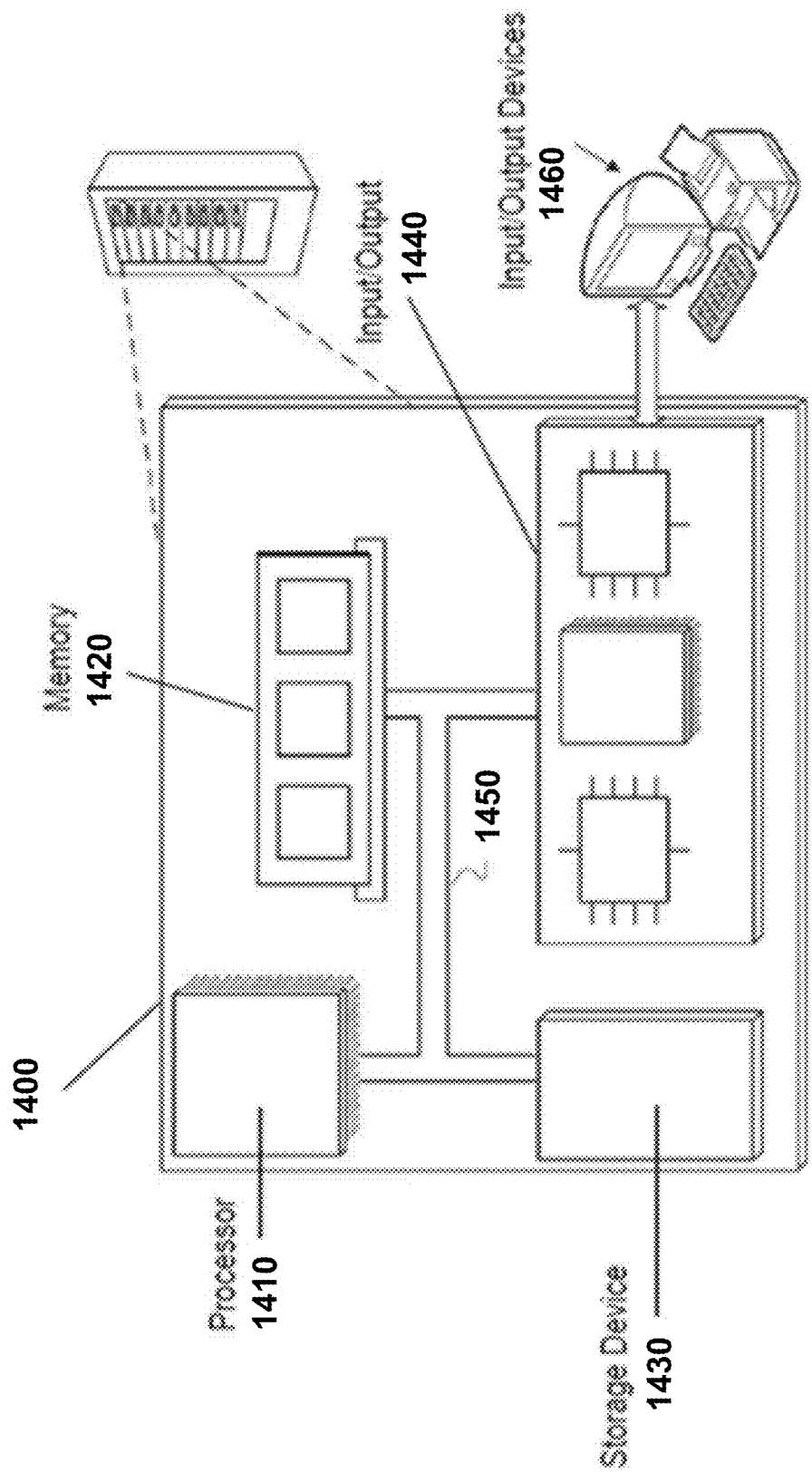
FIG. 14 depicts a block diagram of an example computer system.

FIG. 14 is a block diagram of an example computer system 1400 that may be used in implementing the technology described in this document. General-purpose computers, network appliances, mobile devices, or other electronic systems may also include at least portions of the system 1400. The system 1400 includes a processor 1410, a memory 1420, a storage device 1430, and an input/output device 1440. Each of the components 1410, 1420, 1430, and 1440 may be interconnected, for example, using a system bus 1450. The processor 1410 is capable of processing instructions for execution within the system 1400. In some implementations, the processor 1410 is a single-threaded processor. In some implementations, the processor 1410 is a multi-threaded processor. The processor 1410 is capable of processing instructions stored in the memory 1420 or on the storage device 1430.

The memory 1420 stores information within the system 1400. In some implementations, the memory 1420 is a non-transitory computer-readable medium. In some implementations, the memory 1420 is a volatile memory unit. In some implementations, the memory 1420 is a non-volatile memory unit.

The storage device 1430 is capable of providing mass storage for the system 1400. In some implementations, the storage device 1430 is a non-transitory computer-readable medium. In various different implementations, the storage device 1430 may include, for example, a hard disk device, an optical disk device, a solid-date drive, a flash drive, or some other large capacity storage device. For example, the storage device may store long-term data (e.g., database data, file system data, etc.). The input/output device 1440 provides input/output operations for the system 1400. In some implementations, the input/output device 1440 may include one or more of a network interface device, e.g., an Ethernet card, a serial communication device, e.g., an RS-232 port, and/or a wireless interface device, e.g., an 802.11 card, a 3G wireless modem, or a 4G wireless modem. In some implementations, the input/output device may include driver devices configured to receive input data and send output data to other input/output devices, e.g., keyboard, printer and display devices 1460. In some examples, mobile computing devices, mobile communication devices, and other devices may be used.

In some implementations, at least a portion of the approaches described above may be realized by instructions that upon execution cause one or more processing devices to carry out the processes and functions described above. Such instructions may include, for example, interpreted instructions such as script instructions, or executable code, or other instructions stored in a non-transitory computer readable medium. The storage device 1430 may be implemented in a distributed way over a network, such as a server farm or a set of widely distributed servers, or may be implemented in a single computing device.

Although an example processing system has been described in FIG. 12, embodiments of the subject matter, functional operations and processes described in this specification can be implemented in other types of digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "system" may encompass all kinds of apparatus, devices, and machines for processing data, including by way of example a programmable processor, a computer, or multiple processors or computers. A processing system may include special purpose logic circuitry, e.g., an FPGA (field programmable gate array) or an ASIC (application specific integrated circuit). A processing system may include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program can include, by way of example, general or special purpose microprocessors or both, or any other kind of central processing unit. Generally, a central processing unit will receive instructions and data from a read-only memory or a random access memory or both. A computer generally includes a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Terminology

The phraseology and terminology used herein is for the purpose of description and should not be regarded as limiting.

The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of" "only one of" or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps or stages may be provided, or steps or stages may be eliminated, from the described processes. Accordingly, other implementations are within the scope of the following claims.

The invention claimed is:

1. A computer-implemented method for identifying infrastructure attacks, the method comprising:
   monitoring system level activities by a plurality of software agents deployed on respective operating systems;
   constructing, based on the system level activities, an execution graph comprising a plurality of execution trails;
   identifying a logon session between a remote connection client executing on a first one of the operating systems and a remote connection server executing on a second one of the operating systems;
   attributing, to a first global execution trail in the execution graph, behavior exhibited from the logon session;
   identifying a reconnection to the logon session between a remote connection client executing on a third one of the operating systems and the remote connection server; and
   following the reconnection, attributing, to a second global execution trail in the execution graph, behavior exhibited from the logon session.

2. The method of claim 1, wherein identifying the logon session comprises:
   identifying an process connection event issued by the remote connection client on the first operating system to connect with the remote connection server on the second operating system;
   creating, in a first local execution trail associated with the first operating system, a node corresponding to the process connection event issued by the remote connection client on the first operating system;
   identifying, on the second operating system, a logon event for the logon session corresponding to the process connection event issued by the remote connection client on the first operating system;
   creating, in a second local execution trail associated with the second operating system, a node corresponding to the logon event; and
   forming an edge between the first local execution trail and the second local execution trail.

3. The method of claim 2, further comprising assigning to the first global execution trail, based on the logon session, the first local execution trail and the second local execution trail.

4. The method of claim 2, wherein attributing behavior exhibited from the logon session to the first global execution trail comprises:
   identifying, on the second operating system, a creation of a process in the logon session; and
   associating the process with the second local execution trail.

5. The method of claim 1, wherein identifying the reconnection to the logon session comprises:
   identifying an process connection event issued by a remote connection client on a third one of the operating systems to connect with the remote connection server on the second operating system;
   creating, in a third local execution trail associated with the third operating system, a node corresponding to the process connection event issued by the remote connection client on the third operating system;
   identifying, on the second operating system, a reconnect event for the logon session corresponding to the process connection event issued by the remote connection client on the third operating system;
   creating, in a fourth local execution trail associated with the second operating system, a node corresponding to the reconnect event; and forming an edge between the third local execution trail and the fourth local execution trail.

6. The method of claim 5, further comprising assigning to the second global execution trail, based on the reconnection to the logon session, the third local execution trail and the fourth local execution trail.

7. The method of claim 5, wherein attributing behavior exhibited from the logon session to the second global execution trail comprises:
identifying, on the second operating system, a creation of a process in the logon session; and
associating the process with the fourth local execution trail.

8. The method of claim 1, wherein the system level activities comprise Remote Desktop Protocol (RDP) events, wherein the remote connection client comprises an RDP client, and wherein the remote connection server comprises an RDP server.

9. The method of claim 1, wherein the execution graph constructed by a particular one of the software agents comprises a plurality of nodes and a plurality of edges connecting the nodes, wherein each node represents an entity comprising a process or an artifact, and wherein each edge represents an event associated with an entity.

10. The method of claim 1, further comprising determining a risk score for each of the global execution trails, wherein the risk score for a particular one of the global execution trails is determined based on risk scores of local execution trails from which the particular global execution trail is formed.

11. A system for identifying infrastructure attacks, the system comprising:
a processor; and
a memory storing computer-executable instructions that, when executed by the processor, program the processor to perform the operations of:
monitoring system level activities by a plurality of software agents deployed on respective operating systems;
constructing, based on the system level activities, an execution graph comprising a plurality of execution trails;
identifying a logon session between a remote connection client executing on a first one of the operating systems and a remote connection server executing on a second one of the operating systems;
attributing, to a first global execution trail in the execution graph, behavior exhibited from the logon session;
identifying a reconnection to the logon session between a remote connection client executing on a third one of the operating systems and the remote connection server; and
following the reconnection, attributing, to a second global execution trail in the execution graph, behavior exhibited from the logon session.

12. The system of claim 11, wherein identifying the logon session comprises:
identifying an process connection event issued by the remote connection client on the first operating system to connect with the remote connection server on the second operating system;
creating, in a first local execution trail associated with the first operating system, a node corresponding to the process connection event issued by the remote connection client on the first operating system;
identifying, on the second operating system, a logon event for the logon session corresponding to the process connection event issued by the remote connection client on the first operating system;
creating, in a second local execution trail associated with the second operating system, a node corresponding to the logon event; and
forming an edge between the first local execution trail and the second local execution trail.

13. The system of claim 12, wherein the operations further comprise assigning to the first global execution trail, based on the logon session, the first local execution trail and the second local execution trail.

14. The system of claim 12, wherein attributing behavior exhibited from the logon session to the first global execution trail comprises:
identifying, on the second operating system, a creation of a process in the logon session; and
associating the process with the second local execution trail.

15. The system of claim 11, wherein identifying the reconnection to the logon session comprises:
identifying an process connection event issued by a remote connection client on a third one of the operating systems to connect with the remote connection server on the second operating system;
creating, in a third local execution trail associated with the third operating system, a node corresponding to the process connection event issued by the remote connection client on the third operating system;
identifying, on the second operating system, a reconnect event for the logon session corresponding to the process connection event issued by the remote connection client on the third operating system;
creating, in a fourth local execution trail associated with the second operating system, a node corresponding to the reconnect event; and
forming an edge between the third local execution trail and the fourth local execution trail.

16. The system of claim 15, wherein the operations further comprise assigning to the second global execution trail, based on the reconnection to the logon session, the third local execution trail and the fourth local execution trail.

17. The system of claim 15, wherein attributing behavior exhibited from the logon session to the second global execution trail comprises:
identifying, on the second operating system, a creation of a process in the logon session; and
associating the process with the fourth local execution trail.

18. The system of claim 11, wherein the system level activities comprise Remote Desktop Protocol (RDP) events, wherein the remote connection client comprises an RDP client, and wherein the remote connection server comprises an RDP server.

19. The method of claim 1, wherein the execution graph constructed by a particular one of the software agents comprises a plurality of nodes and a plurality of edges connecting the nodes, wherein each node represents an entity comprising a process or an artifact, and wherein each edge represents an event associated with an entity.

20. The system of claim 11, wherein the operations further comprise determining a risk score for each of the global execution trails, wherein the risk score for a particular one of the global execution trails is determined based on risk scores of local execution trails from which the particular global execution trail is formed.

* * * * *